US012165005B1

(12) United States Patent
Kubica

(10) Patent No.: US 12,165,005 B1
(45) Date of Patent: Dec. 10, 2024

(54) PAULI SURFACE CODES

(71) Applicant: Amazon Technologies, Inc., Seattle, WA (US)

(72) Inventor: Aleksander Marek Kubica, Los Angeles, CA (US)

(73) Assignee: Amazon Technologies, Inc., Seattle, WA (US)

( * ) Notice: Subject to any disclaimer, the term of this patent is extended or adjusted under 35 U.S.C. 154(b) by 572 days.

(21) Appl. No.: 17/486,467

(22) Filed: Sep. 27, 2021

(51) Int. Cl.
*G06N 10/00* (2022.01)
*G06F 11/34* (2006.01)
*G06N 20/00* (2019.01)

(52) U.S. Cl.
CPC ......... *G06N 10/00* (2019.01); *G06F 11/3442* (2013.01); *G06N 20/00* (2019.01)

(58) Field of Classification Search
CPC ........ G06N 10/00; G06N 10/20; G06N 10/40; G06N 10/60; G06N 10/70; G06N 10/80; G06N 20/00; G06F 11/3442
USPC .......................................................... 716/100
See application file for complete search history.

(56) References Cited

U.S. PATENT DOCUMENTS

| | | | |
|---|---|---|---|
| 11,437,995 B1 | 9/2022 | Haah | |
| 11,521,104 B2 | 12/2022 | Delfosse | |
| 11,748,652 B1 | 9/2023 | Kubica | |
| 11,900,221 B1 | 2/2024 | Chamberland | |
| 2021/0126652 A1* | 4/2021 | Delfosse | ................ G06N 10/00 |
| 2022/0216884 A1 | 7/2022 | Delfosse | |

OTHER PUBLICATIONS

U.S. Appl. No. 17/486,503, filed Sep. 27, 2021, Aleksander Marek Kubica.
A. Y. Kitaev, "Fault-tolerant quantum computation by anyons," Journal reference: Annals Phys. 303 (2003) 2-30, arXiv:quant-ph/9707021, pp. 1-27.
S. B. Bravyi and A. Y. Kitaev, "Quantum codes on a lattice with boundary," arXiv (1998), arXiv:quant-ph/9811052, pp. 1-6.
M. H. Freedman and D. A. Meyer, "Projective plane and planar quantum codes," Found. Comp. Math. 1, 325 (2001), arXiv:quant-ph/9810055 Oct. 1998, pp. 1-7.
H. Bombin, "Topological Order with a Twist: Ising Anyons from an Abelian Model," Journal reference: Phys.Rev.Lett.105:030403,2010, 10.1103/PhysRevLett. 105.030403, arXiv: 1004.1838, pp. 1-5.

(Continued)

*Primary Examiner* — Paul Dinh
(74) *Attorney, Agent, or Firm* — Alexander A. Knapp; Kowert, Hood, Munyon, Rankin & Goetzel, P.C.

(57) ABSTRACT

Pauli surface codes form a class of two-dimensional codes from which a two-dimensional code may be selected to store quantum information for a particular application. The Pauli surface codes allow more flexibility in selecting a code configuration that bests meets the need of the particular application. For example, Pauli surface codes are not restricted to placing qubits on a square grid, as has been the case in previous surface codes. Additionally, a process for selecting a configuration to be used to implement a two-dimensional code for storing quantum information considers different Pauli codes and may utilize a machine learning algorithm to select a given Pauli code that is well suited for the particular application.

20 Claims, 20 Drawing Sheets

(56) References Cited

OTHER PUBLICATIONS

T. J. Yoder and I. H. Kim, "The surface code with a twist," Journal reference: Quantum 1, 2 (2017), arXiv: 1612.04795, pp. 1-19.
J. P. B. Ataides, D. K. Tuckett, S. D. Bartlett, S. T. Flammia, and B. J. Brown, "The XZZX Surface Code," Journal reference: Nat. Commun. 12, 2172 (2021). arXiv (2020), arXiv:2009.07851, pp. 1-16.
S. Bravyi, M. Suchara, and A. Vargo, "Efficient Algorithms for Maximum Likelihood Decoding in the Surface Code," Journal Reference: Physical Review A—Atomic, Molecular, and Optical Physics 90 (2014), 10.1103/PhysRevA.90.032326, arXiv:1405.4883, pp. 1-18.
C. T. Chubb, "General tensor network decoding of 2D Pauli codes," arXiv (2021), arXiv:2101.04125, pp. 1-11.
E. Dennis, A. Kitaev, A. Landahl, and J. Preskill, "Topological quantum memory," Journal of Mathematical Physics 43, 4452 (2002), arXiv:0110143 [quant-ph], pp. 1-39.
C. Horsman, A. G. Fowler, S. Devitt, and R. V. Meter, "Surface code quantum computing by lattice surgery," New Journal of Physics 14 (2012), 10.1088/1367-2630/14/12/123011, arXiv:1111.4022, pp. 1-29.
D. Litinski, "A Game of Surface Codes: Large-Scale Quantum Computing with Lattice Surgery," Quantum 3 (2019), 10.22331/q-2019-03-05-128, arXiv:1808.02892, pp. 1-37.
G. Brinkmann, S. Greenberg, C. Greenhill, B. D. Mckay, R. Thomas, and P. Wollan, "Generation of simple quadrangulations of the sphere," Discrete mathematics 305, (2005), pp. 33-54.
N. Delfosse and N. H. Nickerson, "Almost-linear time decoding algorithm for topological codes," arXiv (2017), arXiv:1709.06218, pp. 1-10.
G. Duclos-Cianci and D. Poulin, "Fast Decoders for Topological Quantum Codes," Physical Review Letters 104, 050504 (2010 The American Physical Society), pp. 1-4.

* cited by examiner

Determine a logical correction for the two-dimensional code using the contracted tensor network and noise tensor network to decode the syndrome measurements
1112

For each choice of logical parameters ($\lambda_X$) or ($\lambda_Z$) describing the logical operator, evaluate the logical error rate
1150

Select as a logical correction the choice of logical parameters ($\lambda_X$) or ($\lambda_Z$) returning the smallest logical error rate
1152

*FIG. 11B*

PAULI SURFACE CODES

BACKGROUND

Quantum computing utilizes the laws of quantum physics to process information. Quantum physics is a theory that describes the behavior of reality at the fundamental level. It is currently the only physical theory that is capable of consistently predicting the behavior of microscopic quantum objects like photons, molecules, atoms, and electrons.

A quantum computer is a device that utilizes quantum mechanics to allow one to write, store, process and read out information encoded in quantum states, e.g. the states of quantum objects. A quantum object is a physical object that behaves according to the laws of quantum physics. The state of a physical object is a description of the object at a given time.

In quantum mechanics, the state of a two-level quantum system, or simply, a qubit, is a list of two complex numbers whose squares sum up to one. Each of the two numbers is called an amplitude, or quasi-probability. The square of an amplitude gives a potentially negative probability. Hence, each of the two numbers correspond to the square root that event zero and event one will happen, respectively. A fundamental and counterintuitive difference between a probabilistic bit (e.g. a traditional zero or one bit) and the qubit is that a probabilistic bit represents a lack of information about a two-level classical system, while a qubit contains maximal information about a two-level quantum system.

Quantum computers are based on such quantum bits (qubits), which may experience the phenomena of "superposition" and "entanglement." Superposition allows a quantum system to be in multiple states at the same time. For example, whereas a classical computer is based on bits that are either zero or one, a qubit may be both zero and one at the same time, with different probabilities assigned to zero and one. Entanglement is a strong correlation between quantum particles, such that the quantum particles are inextricably linked in unison even if separated by great distances.

There are different types of qubits that may be used in quantum computers, each having different advantages and disadvantages. For example, some quantum computers may include qubits built from superconductors, trapped ions, semiconductors, photonics, etc. Each may experience different levels of interference, errors and decoherence. Also, some may be more useful for generating particular types of quantum circuits or quantum algorithms, while others may be more useful for generating other types of quantum circuits or quantum algorithms.

BRIEF DESCRIPTION OF THE DRAWINGS

FIG. 11B is a flowchart illustrating additional details regarding how a logical correction is determined when decoding syndrome measurements of a Pauli surface code using a tensor network decoder, according to some embodiments.

Figure 1:
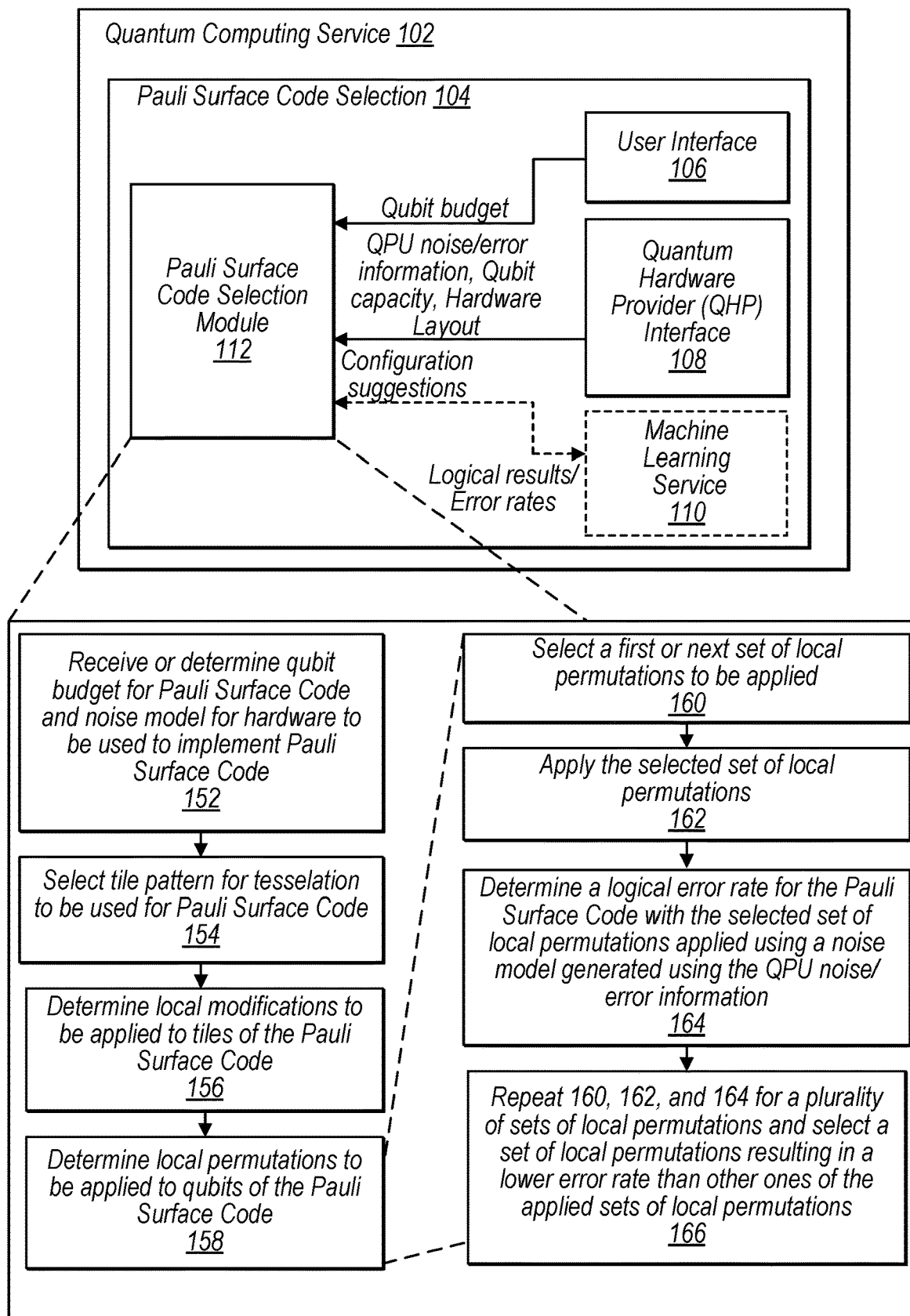
FIG. 1 illustrates an example quantum computing service that includes a Pauli surface code selection module enabling selection of a two-dimensional code that conforms to a qubit budget and/or an error rate requirement for storing quantum information, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and apparatus for selecting configurations for a two-dimensional code for storing quantum information. The present disclosure also relates to Pauli surface codes which form a class of two-dimensional codes from which a two-dimensional code may be selected to store quantum information. The Pauli surface codes allow more flexibility in selecting a code configuration that bests meets the need of a particular application. For example, Pauli surface codes are not restricted to placing qubits on a square grid, as has been the case in previous surface codes.

In some situations, biased noise can reduce the efficiency or error-rate of a two-dimensional code. For example, unbalanced noise bias can lead to errors in decoding a two-dimensional code if not properly accounted for in the decoding process. In some embodiments, Pauli surface codes and methods and techniques for selecting a Pauli surface code, as described herein, provide a framework for specifying a two-dimensional code that meets customized criteria to address a particular situation. For example, in some embodiments, a qubit budget may be specified, a desired logical error-rate may be specified, error probabilities for quantum gates of a quantum hardware device that is to be used to implement the Pauli surface code may be specified or provided, etc. Using these inputs Pauli surface codes provide a framework for selecting a two-dimensional code implementation that meets the provided or specified criteria. For example, a tile pattern, a set of local modifications to be applied to respective ones of the tiles, sets of local permutations to be applied to the qubits of the tiles, twists defects to be selected along the edges of the tiles, etc. may be specified in an optimal manner using Pauli surface codes such that a two-dimensional code is selected satisfying the provided or specified requirements. Furthermore, in some embodiments, a machine learning algorithm or other process, may be used to determine an optimized configuration for a two-dimensional code that optimizes the code configuration in one or more dimensions, such as optimizing the two-dimensional code configuration to use a least number of qubits to achieve a given error rate, or optimizing the two-dimensional code configuration to achieve a lowest possible error rate within a given qubit budget, etc.

Whereas traditional surface codes use fixed configurations that leave little to no room for optimization, Pauli surface codes allow for optimization based at least in part on 1) selecting a tessellation pattern used for the two-dimensional code, 2) determining local modifications to be applied to respective ones of the tiles of the selected tessellation pattern, 3) determining local permutations to be applied to qubits of the two-dimensional code, and 4) determining localized twist defects to be included for the two-dimensional code.

In some embodiments, a Pauli surface code selection module of a quantum computing service uses a machine learning algorithm to explore various possible combinations of tile-patterns, local modifications, local permutations, twist defects, etc. that may be applied to a two-dimensional code to select a two-dimensional code that satisfies a given set of specifications or requirements. Also, in some embodiments, a machine learning algorithm may be used to determine a configuration for a two-dimensional code that is optimized in one or more dimensions, such as number of qubits, error-rate, etc.

In some embodiments, Pauli surface codes provide improvement over previous surface codes by enabling less overall noise bias than in previous surface codes and/or allowing for configurations that result in predictable noise bias. For example, if noise bias is predictable, it can be accounted for when decoding the two-dimensional code, thus resulting in lower logical error rates.

As described herein, in some embodiments, efficiency refers to a two-dimensional code that has a lowest error-rate within a set of constraints, such as within a fixed number of qubits and/or using a particular type of quantum hardware. As an example, in previous surface codes, X-type errors are protected against by storing quantum data in repeating qubits in a first dimension (e.g., X dimension) and Z-type errors are protected against by storing quantum data in repeating qubits in a second dimension (e.g., Z dimension). In such surface codes, if errors due to noise bias are unpredictable, the errors must be protected against by including a sufficiently high number of qubits in both dimensions (e.g. the X dimension and the Z dimension). However, when using Pauli surface codes, bias noise can be designed to have a predictable bias, for example in the X dimension OR the Z dimension. Thus, as a simplified example, instead of including repeating qubits U times in the X-dimension and V times in the Z dimension, a similar error rate may be achievable (due to predictable noise bias) by only including, for example V/2 (e.g., half) the number of qubits in the Z dimension if the noise is biased to be in the X-direction, as an example.

In some embodiments, Pauli surface codes form a class of two-dimensional topological stabilizer codes that can be defined on a tessellation of a two-dimensional manifold. The Pauli surface codes may, in some embodiments, further include boundary qubits. The stabilizer generators of a Pauli surface code may be obtained by conjugating stabilizer generators of a surface code with a transversal Clifford operator.

For example, let (V, E, F) be a tessellation of a manifold M with a boundary $\partial M$ which consists of vertices V, edges E and faces F. The vertices and edges which belong to the boundary $\partial M$ can be referred to as boundary vertices and boundary edges. All other vertices and edges may be referred to as interior vertices and interior edges. With these definitions, in a Pauli surface code, the tessellation satisfies the following two conditions:

(i) colorability—faces F are two-colorable (and labeled as X and Z), and
 (ii) valence—boundary vertices have degree three or four and interior vertices have degree four valences.

Note that colorability refers to face coloring as commonly used in graph theory, wherein in a planar graph (e.g. two-dimensional code) colors are assigned such that no two faces that share a common boundary have the same color. For example, as shown in FIGS. 4-8, the faces are colored a first color (e.g. white) or a second color (e.g. hatch pattern) where no two faces that share a common boundary have the same color.

To define a Pauli surface code, a qubit can be added for each vertex v∈ V. Also, an element $\sigma_v \in S_3$ of a permutation group of labels {X, Y,Z} for the vertex is specified. For every face f ∈ F a stabilizer generator is introduced as follows:

$$S_f = \prod_{v \in f} P_v^{\sigma_{v(l)}}$$

where l∈ {X, Z} is the label of the face f and $P_v^{\sigma_{v(l)}}$ is a Pauli $\sigma_v$ (l) operator acting on the qubit placed at the vertex v, which belongs to face f. The stabilizer group of the Pauli surface code is then defined as $S = \langle S_f | f \in F \rangle$.

Once the Pauli surface code is defined on the tessellation (V, E, F) additional modifications may be made, such as adding twist defects. For example, say that a path γ⊆E is corner-free if no two consecutive edges in the path γ belong to the same face. Let $\Gamma = U_{\gamma_i}$ be a collection of non-intersecting corner-free paths, which contain only interior edges. For the endpoints of paths $\gamma_i$'s to correspond to twist defects, the Pauli surface code is modified as follows:

for every edge e∈ Γ find two faces f, f' ∈ F comprising e and modify the stabilizer group S by replacing two generators $S_f$ and $S_{f'}$ with their product $S_f S_{f'}$; and for every vertex v∈ V incident to only two edges in E\Γ, remove the qubit at vertex v.

The resulting two-dimensional code achieved by following the above steps may be referred to as a Pauli surface code with twist defects.

Figure 4:
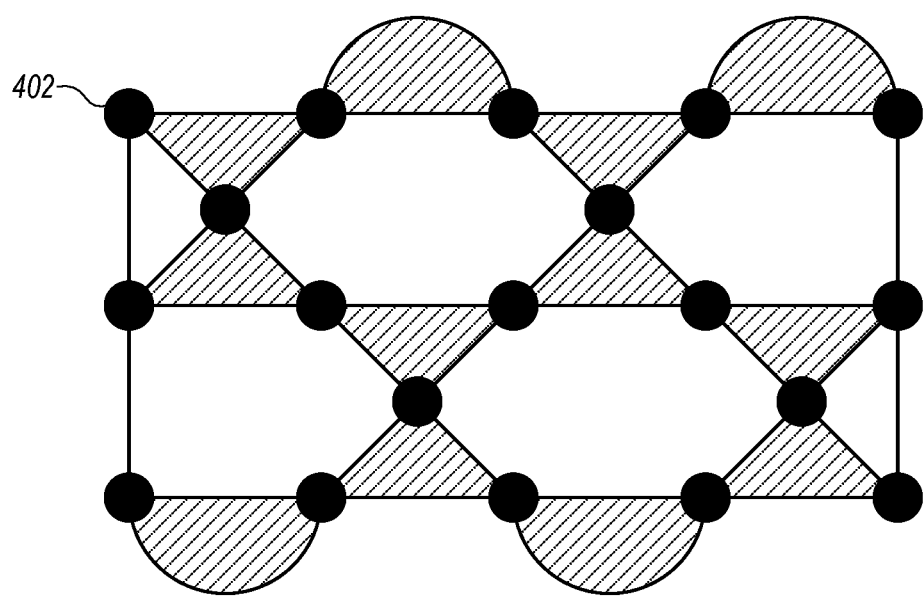
FIG. 4 illustrates a Pauli surface code implemented using a Kagome lattice with a rectangular boundary of size $d_X=3$ and $d_Z=5$ which may be selected as a particular configuration of a Pauli surface code, according to some embodiments.
Figure 5:
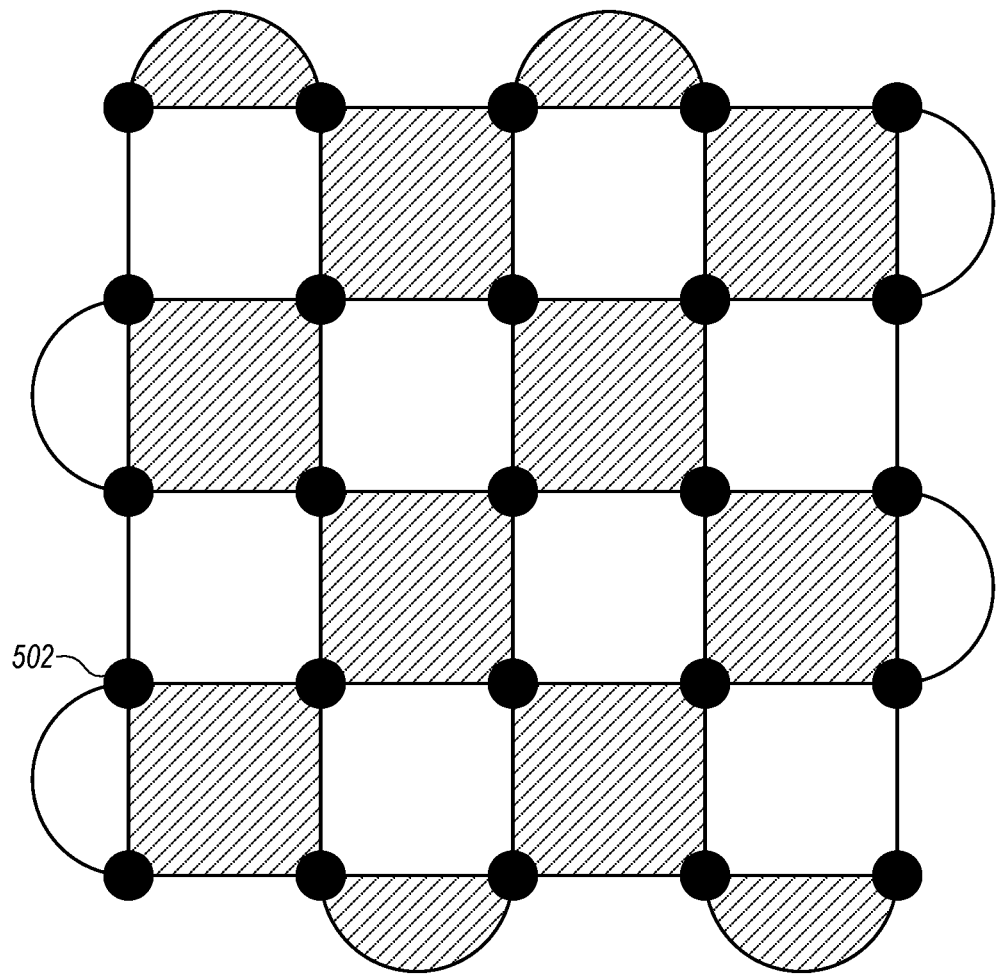
FIG. 5 illustrates a rotated surface code which may be selected as a particular configuration of a Pauli surface code, according to some embodiments.
Figure 6:
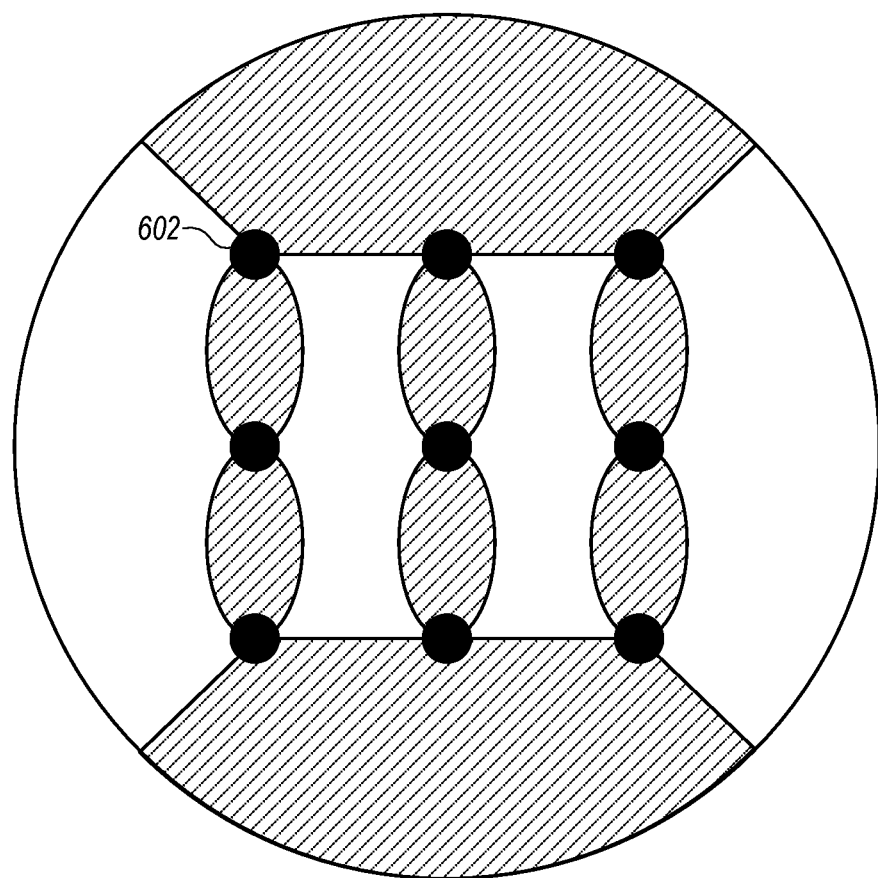
FIG. 6 illustrates a 9-bit Shor's code which may be selected as a particular configuration of a Pauli surface code, according to some embodiments.
Figure 7:
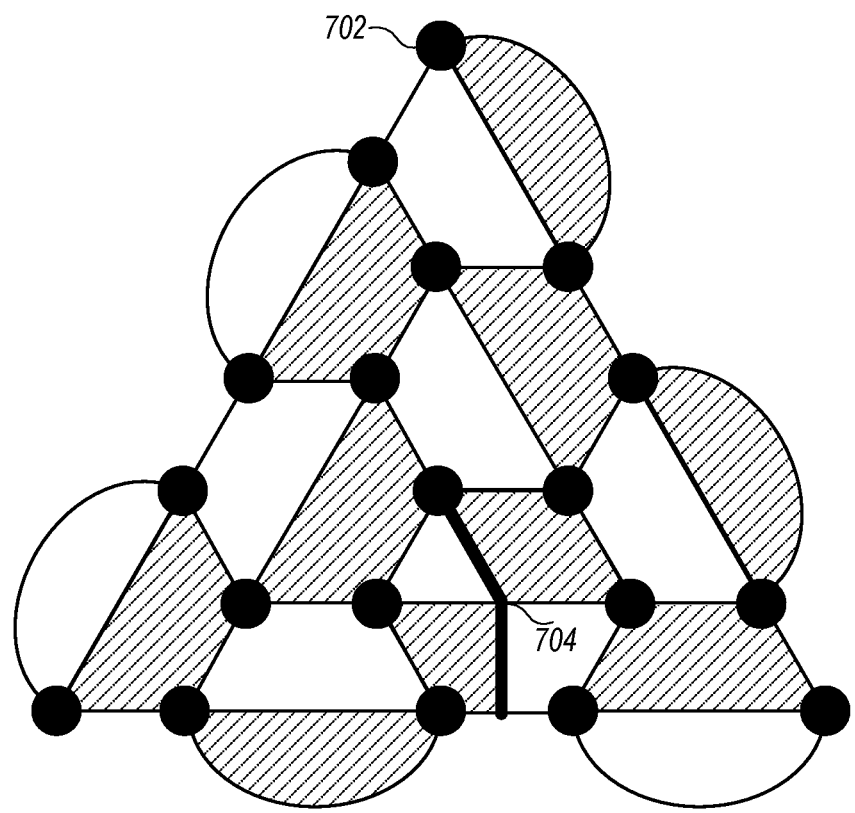
FIG. 7 illustrates a surface code with a twist which may be selected as a particular configuration of a Pauli surface code, according to some embodiments.
Figure 8:
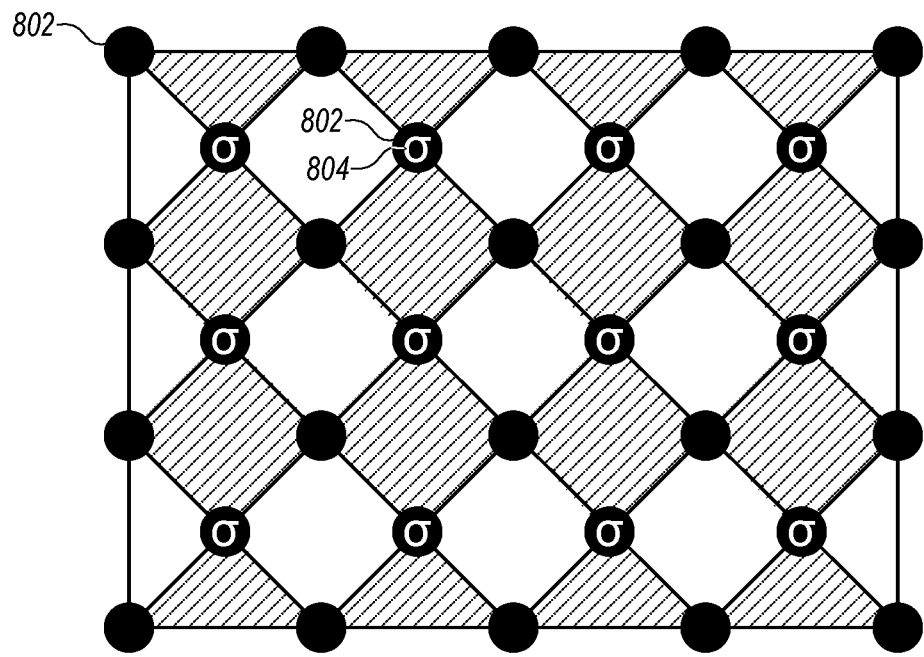
FIG. 8 illustrates a XZZX surface code which may be selected as a particular configuration of a Pauli surface code, according to some embodiments.

Various two-dimensional code models may fall within an overall class of Pauli surface codes, such as a rotated surface code (as shown in FIG. 5), a 9-qubit Shor's code (as shown in FIG. 6), a surface code with a twist (as shown in FIG. 7), and the XZZX surface code (as shown in FIG. 8). Note that in FIGS. 4-8, qubits are depicted as black dots (402, 502, 602, 702, and 802, respectively). Also, faces are depicted as white or grey (e.g. hatched) faces, where the white faces are labeled as Z faces and the grey (hatched) faces are labeled as X faces. The thick edge 704 in the surface code with a twist shown in FIG. 7 depicts a non-intersecting corner-free path. In FIGS. 4-8 each vertex has a trivial permutation assigned to it. In the XZZX surface code shown in FIG. 8, some vertices have a non-trivial permutation σ=(XZ) assigned to them (represented by the white sigma letters 804).

In some embodiments, a particular realization of a Pauli surface code is realized on a Kagome lattice with a rectangular boundary of size $d_X \times d_Z$. For example, the Pauli surface code in FIG. 4 has dimensions $d_X=3$ and $d_Z=5$. Thus, such a version of the Pauli surface code encodes one logical qubit into $(3*d_X*d_Z+d_X-d_Z-1)/2$ physical qubits. This is particularly well-suited for independent identically distributed (iid) noise biased with Pail noise, where the Pauli noise has a strength $$p_X = p_Y = \frac{p_Z}{2n}$$

and bias n>>1. The representatives of logical Pauli X and Z operators can be chosen to be vertical and horizontal strings of Pauli X and Z operators. Importantly, every representative of the logical Pauli X or Z operator has X- or Z-weight of at least $d_X$ or $d_Z$, respectively. Thus, to the leading order in the noise strength the logical error rate for the optimal decoder is proportional to $\max(p_X^{(d_X+1)/2}, p_Z^{(d_Z+1)/2})$ Note that for any Pauli operator $\otimes_i X_i^{b_i} Z_i^{b_i}$, where $a_i, b_i \in \{0,1\}$, the X- and Z-weights are defined to be $\Sigma_i a_i$ and $\Sigma_i b_i$, respectively.

In some embodiments, the Pauli surface code implemented via the Kagome lattice has a code capacity threshold of 50% in the infinite bias limit, e.g. n=∞. Additionally, the code capacity threshold can be estimated using a decoder based on a tensor network, as further described below. In order to account for measurement errors (as opposed to noise errors), multiple rounds of syndrome extraction may be performed and a minimum-weight perfect matching decoder with weighted edges may be used. Also, lattice surgery methods may be performed on the Pauli surface code implemented via the Kagome lattice as shown in FIG. 4 to perform fault-tolerant logical computation. In some embodiments, to diagnose and correct dominant Z errors, small-weight stabilizer operators may be used on gray (hatched) faces labeled X. Those operators can be measured more quickly and more reliably than higher-weight stabilizer operators on white faces labeled Z. Such faces may be used to diagnose and correct X and Y errors.

Search processes for selecting a Pauli surface code are further shown in FIGS. 1-3 and may be implemented in a quantum computing service using a Pauli surface code selection process. In some embodiments, a search process may focus on Pauli surface codes that encode one logical qubit using n qubits, wherein n≤20. However, the Pauli surface code also includes ancilla qubits for syndrome extraction. Thus, a total number of qubits may be larger, such as approximately 2n. In some embodiments, at a high-level, a search process for selecting a Pauli surface code comprises (1) choosing a tessellation and choosing stabilizers for a given tessellation. Also, in some embodiments, the search may focus on vertices that are assigned trivial permutations or non-trivial permutations such as σ=(XZ).

FIG. 1 illustrates an example quantum computing service that includes a Pauli surface code selection module enabling selection of a two-dimensional code that conforms to a qubit budget and/or an error rate requirement for storing quantum information, according to some embodiments.

Figure 9:
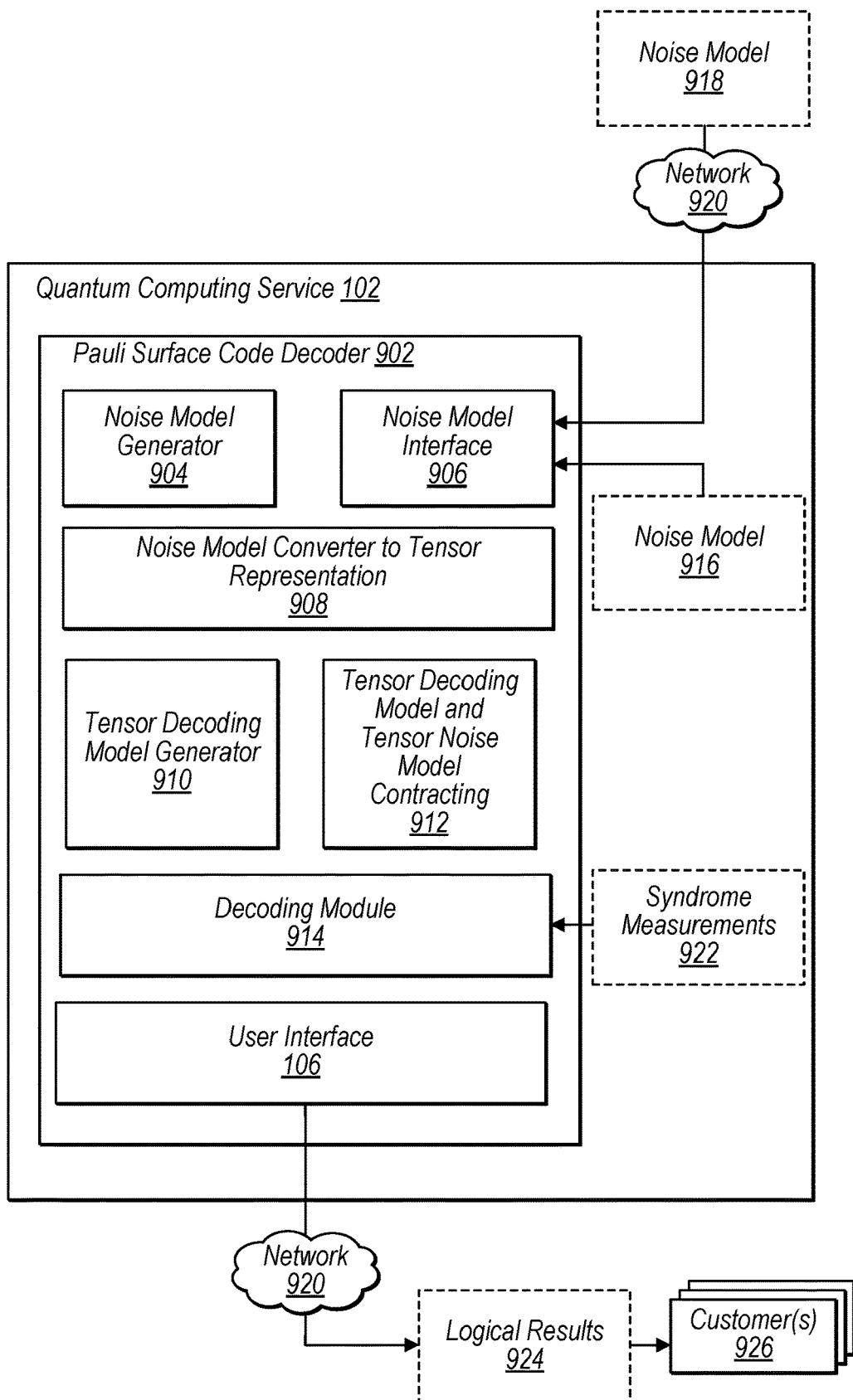
FIG. 9 illustrates an example quantum computing service that includes a Pauli surface code decoder, according to some embodiments.
Figure 15:
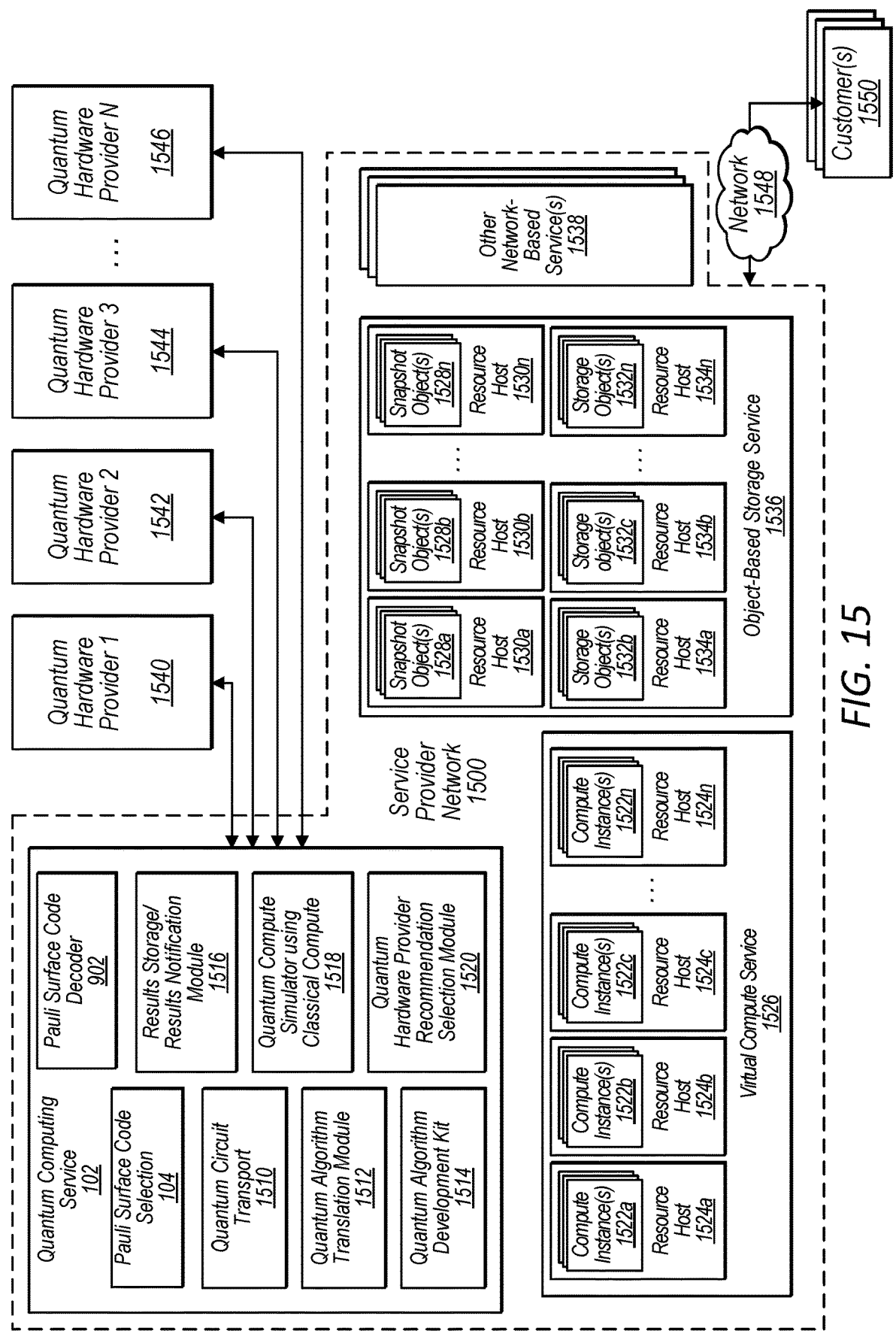
FIG. 15 illustrates an example provider network that includes a quantum computing service which includes a Pauli surface code selection module and a Pauli surface code decoder, wherein the quantum computing service is coupled to a plurality of quantum hardware providers, according to some embodiments.

In some embodiments, a quantum computing service, such as quantum computing service 102, includes a Pauli surface code selection service 104. Note that for ease of illustration FIG. 1 only illustrates the Pauli surface code selection service 104 of quantum computing service 102. However, in some embodiments quantum computing service 102 may include other elements, such as a Pauli surface code decoder, such as illustrated in FIG. 9 and/or other modules and services as illustrated in FIG. 15.

Pauli surface code selection service 104 includes a user interface 106 that provides an interface (e.g. application programmatic interface, command line interface, console, etc.) that enables a customer of a quantum computing service to submit parameters to be used in selecting a Pauli surface code configuration. For example, a customer may submit a qubit budget to be used in selecting a Pauli surface code, a logical error rate threshold (e.g. upper limit on acceptable error), and/or specify one or more types of quantum hardware that are to be used to implement the customer's quantum circuit. For example, a customer may specify a particular type of quantum technology to be used, a particular quantum hardware provider to be used, or even specify a particular quantum processing unit (QPU) that is to be used to implement the customer's quantum object, which may include a two-dimensional code selected by Pauli surface code selection module 112. Pauli surface code selection service 104 also includes a quantum hardware provider interface 108 that enables the Pauli surface code selection module 112 to receive information about quantum hardware devices of the quantum service providers, such as hardware layout, QPU noise/error information, qubit capacities, etc. In some embodiments, the quantum hardware provider interface may be implemented via a back-end API transport as further described in FIG. 15, or may be implemented as a separate network link to the quantum hardware providers. In some embodiments, a Pauli surface code selection service, such as Pauli surface code selection service 104, may utilize a machine learning service, such as machine learning service 110, to guide selection of a Pauli surface code. For example, FIG. 3 further discusses how Pauli surface code selection module 112 may interface with a machine learning service, such as machine learning service 110, to accelerate selection of a Pauli surface code.

In some embodiments, at a high-level, Pauli surface code selection module 112 may execute the steps shown as steps 152-166 in order to select a configuration to be used for a Pauli surface code. For example, at block 152, the Pauli surface code selection module 112 receives (e.g., via user interface 106) a qubit budget or determines a qubit budget based on received characteristics of the quantum hardware providers, which may be provided via quantum hardware provider interface 108. Additionally, the Pauli surface code selection module 112 may receive information about performance characteristics of the QPUs of the quantum hardware providers, such as gate-level error rates, correlated errors/noise, etc.

At block 154, the Pauli surface code selection module 112 selects a tile pattern to be used for a Pauli surface code configuration to be evaluated. Then, at block 156 the Pauli surface code selection module 112 determines local modifications to be applied to the tiles of the Pauli surface code, such as combining tiles or splitting tiles. Next, at block 158, the Pauli surface code selection module 112 determines local permutations to be applied to qubits of the Pauli surface code having the selected tessellation. In order to determine the local permutations, at block 160, the Pauli surface code selection module selects a first or next set of local permutations to be applied/evaluated. At block 162 the Pauli surface code selection module 112 applies the selected set of local permutations and at block 164 the Pauli surface code selection module 112 determines a logical error rate for the Pauli surface code having the selected tessellation and having the selected set of local permutations applied. In some embodiments, the logical error rate may be determined using a tensor network decoder as further described in FIGS. 9-14, wherein the tensor network decoder takes into account correlated noise, as indicated in the QPU noise/error information received via the quantum hardware provider interface 108. Alternatively, in some embodiments correlated noise may be determined empirically by the Pauli surface code selection service 104 based on historical results or may be determined according to a theoretical model that models correlated noise for a given one of the types of quantum hardware technologies used by the quantum hardware providers.

At block 166, the Pauli surface code selection module 112 iteratively repeats the steps described in blocks 160, 162, and 164 for a plurality of sets of local permutations and selects, based on the results of such iterative testing, a set of local permutations to be used to configure the Pauli surface code, wherein the selected set of local permutations has a lower logical error rate and/or lower qubit count than other ones of the sets of local permutations evaluated.

Figure 2A:
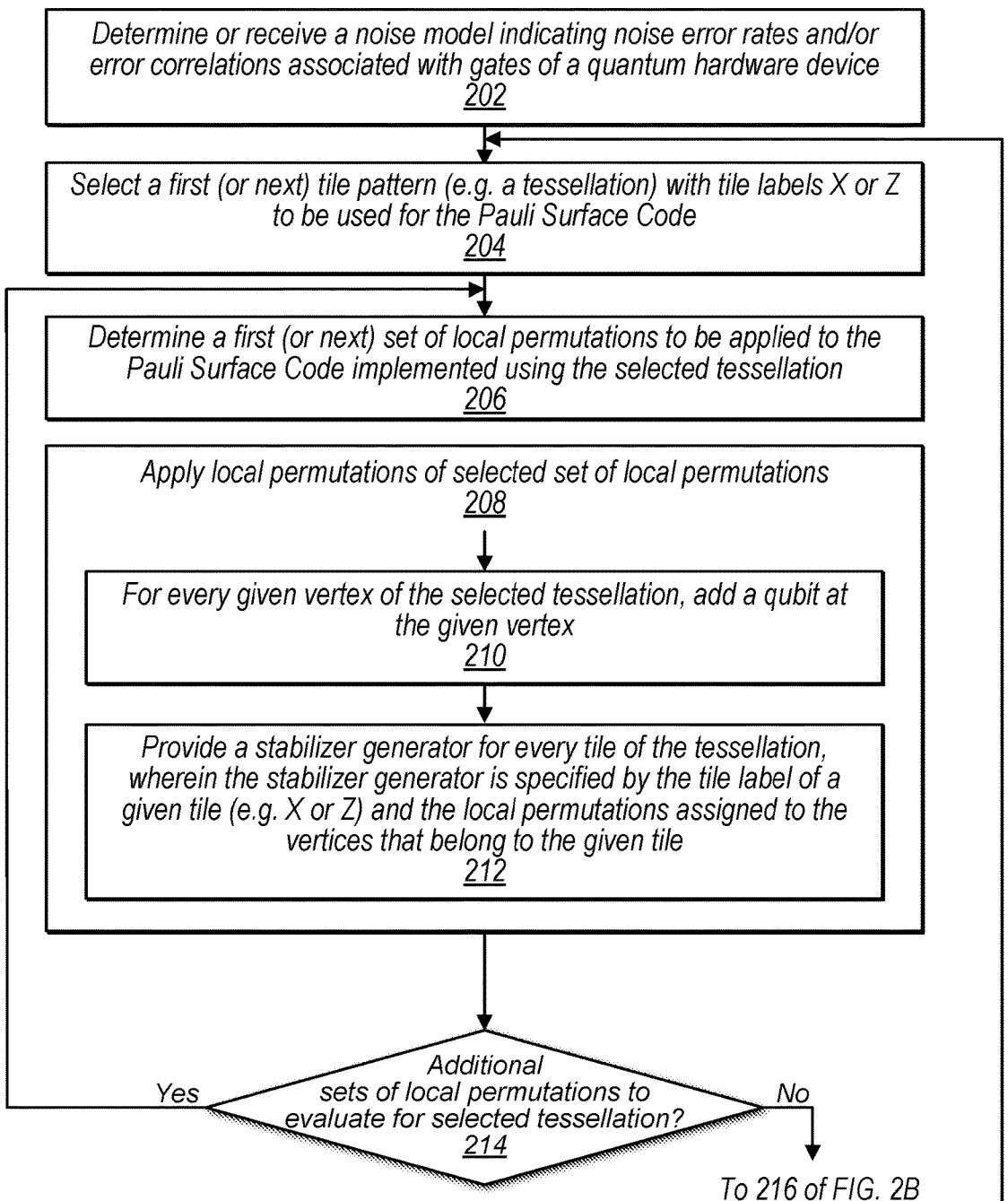
FIGS. 2A-2B are flowcharts illustrating a process for selecting a configuration to be used to implement a two-dimensional code for storing quantum information, according to some embodiments.
Figure 2B:
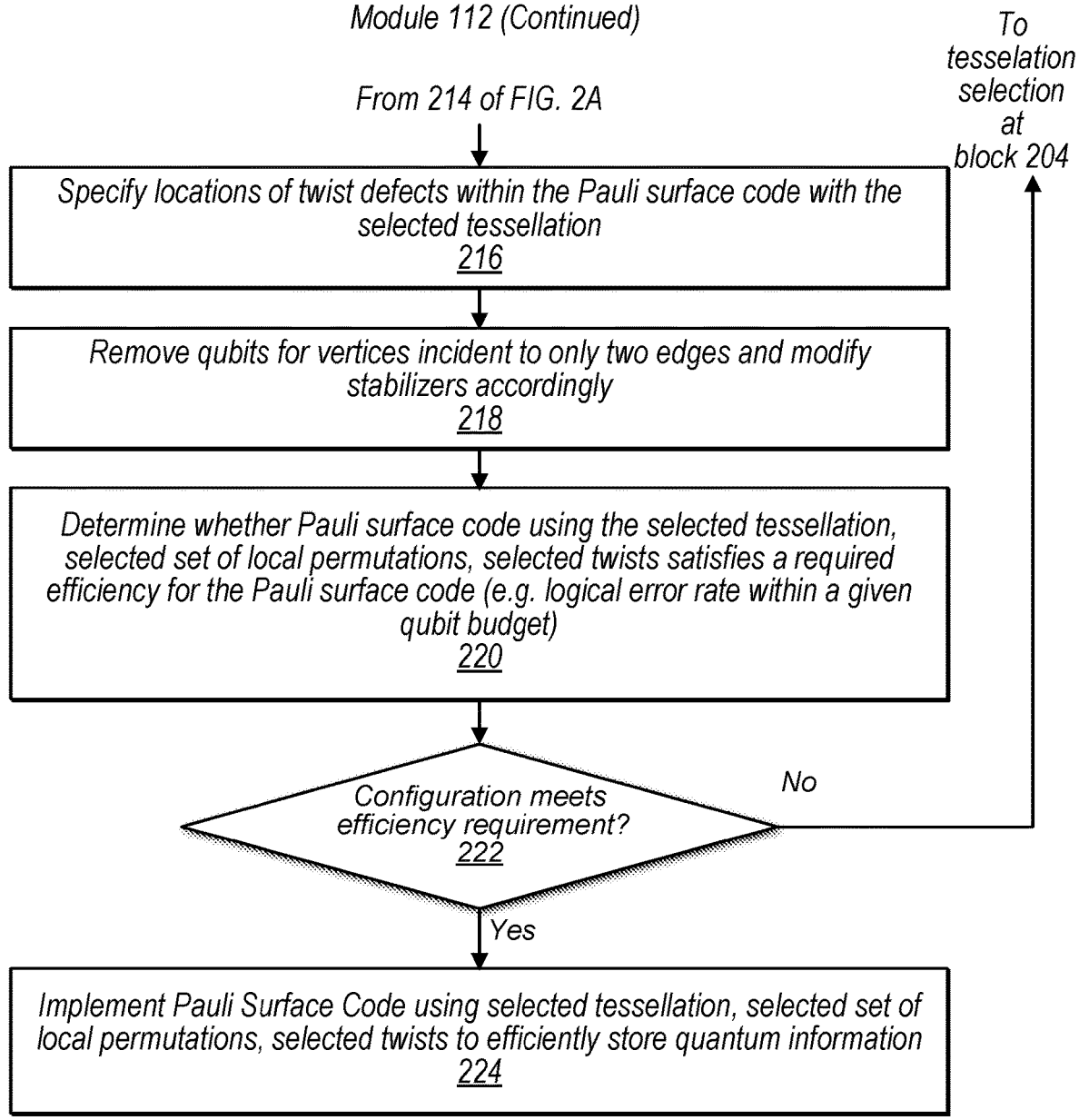

FIGS. 2A-2B are flowcharts illustrating a process for selecting a configuration to be used to implement a two-dimensional code for storing quantum information, according to some embodiments.

In some embodiments, a Pauli surface code selection service, at block 202, receives or determines a noise model indicating noise error rates and/or error correlations associated with gates of a quantum hardware device. For example, the noise model may be a noise model as further discussed below with regard to a tensor network decoder that accounts for correlated noise. At block 204, the Pauli surface code selection service selects a first (or next) tile pattern to be evaluated. The tessellation includes a tile pattern with tile labels X or Z to be used for the Pauli Surface code. Then, at block 206, the Pauli surface code selection service determines a first or next set of local permutations to be applied.

At block 208, the Pauli surface code selection service applies the selected set of local permutations. To do this, at block 210, the Pauli surface code selection service adds a qubit at every given vertex of the selected tile pattern. Then, at block 212, the Pauli surface code selection service provides a stabilizer generator for every tile of the tessellation, wherein the stabilizer generator is specified by the tile label of a given tile (e.g., X or Z) and the local permutations assigned to the vertices that belong to the given tile.

At block 214, the Pauli surface code selection service determines if there are additional sets of local permutations to be evaluated for the selected tessellation. If so, the process reverts to block 206 and is carried out for a next set of local permutations to be evaluated. If not, the process proceeds to block 216 of FIG. 2B.

At block 216, the Pauli surface code selection service specifies locations of twist defects within the Pauli surface code, using a procedure as previously described above. Also, at block 218, the Pauli surface code selection service removes qubits for vertices incident to only two edges and modifies the stabilizers of the Pauli surface code accordingly.

At block 220, the Pauli surface code selection service determines whether the current Pauli surface code being evaluated (e.g., that has the selected tessellation and selected set of local permutations along with any added twist defects and removed qubits) satisfies a required efficiency for the Pauli surface code. For example, an efficiency requirement may have been provided by a customer via user interface 106, or may have been determined based on other parameters requested by the customer. In some embodiments, an efficiency for a Pauli surface code may be defined as a logical error rate within a given qubit budget, such as an error rate for Pauli surface codes constrained to X qubits or less.

At block 222, the Pauli surface code selection service determines whether the current Pauli surface code being evaluated (e.g., that has the selected tessellation and selected set of local permutations along with any added twist defects and removed qubits) meets the efficiency requirements for selection. If not, the process reverts to block 204 and another tessellation is selected and evaluated. If meeting the efficiency requirements, at block 224, the Pauli surface code selection service implements the Pauli surface code using the selected tessellation, the selected set of local permutations, and the selected twist defects to efficiently store quantum information.

Figure 3A:
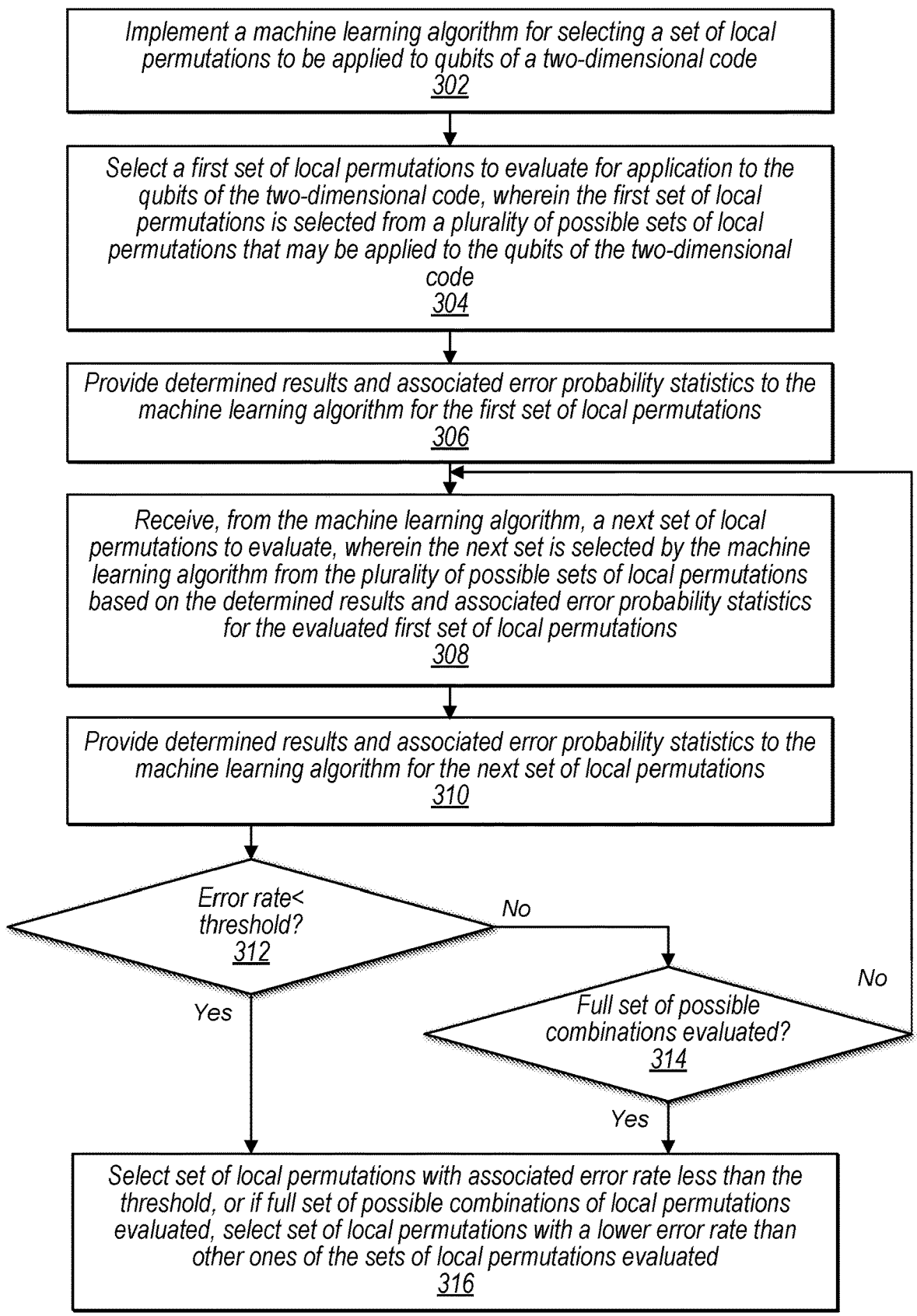
FIG. 3A is a flowchart illustrating a process for selecting, using a machine learning algorithm, a configuration to be used to implement a two-dimensional code for storing quantum information, according to some embodiments.

FIG. 3A is a flowchart illustrating a process for selecting, using a machine learning algorithm, a configuration to be used to implement a two-dimensional code for storing quantum information, according to some embodiments.

In some embodiments, a Pauli surface code selection service, such as Pauli surface code selection service 104, implements a machine learning algorithm, such as via machine learning service 110, for selecting a set of local permutations to be applied to qubits of a two-dimensional code. For example, this is performed at block 302. Then, at block 304, the Pauli surface code selection service selects a first set of local permutations to evaluate for application to the qubits of the two-dimensional code, wherein the first set of local permutations is selected from a plurality of possible sets of local permutations that may be applied to the qubits of the two-dimensional code. Next, at block 306, the Pauli surface code selection service provides determined results and associated error probability statistics to the machine learning algorithm for the first set of local permutations. For example, the determined results and associated error probability statistics may be generated using a similar process as described in FIGS. 2A-2B.

At block 308, the Pauli surface code selection service receives from the machine learning algorithm/machine learning service 110 a next set of local permutations to evaluate, wherein the next set is selected by the machine learning algorithm from the plurality of possible sets of local permutations based on the determined results and associated error probability statistics for the evaluated first set of local permutations. The Pauli surface code selection service evaluates the next set of local permutations and at block 310 provides determined results and associated error probability statistics to the machine learning algorithm for the next set of local permutations.

At block 312, the Pauli surface code selection service determines if an already evaluated set of local permutations results in an error rate lower (e.g. less error) than a threshold error rate, wherein the threshold may be provided by a customer, may be a default error rate, or may be determined from a customer specified efficiency. If the threshold error rate is not met, the Pauli surface code selection service determines at block 314 whether a full set of possible sets of local permutations have already been evaluated. If not, the process reverts to 308 and a next set of local permutations to evaluate is received from the machine learning algorithm/machine learning service 110.

If all sets of local permutations have been evaluated or a set of local permutations satisfying the error threshold have been found, then at block 316 the Pauli surface code selection service selects a set of local permutations to apply, wherein the Pauli surface code selection service selects the set of local permutations with an associated error rate less than the threshold, or if a full set of possible combinations of local permutations has been evaluated, selects the set of local permutations with a lower error rate than other ones of the sets of local permutations evaluated.

Figure 3B:
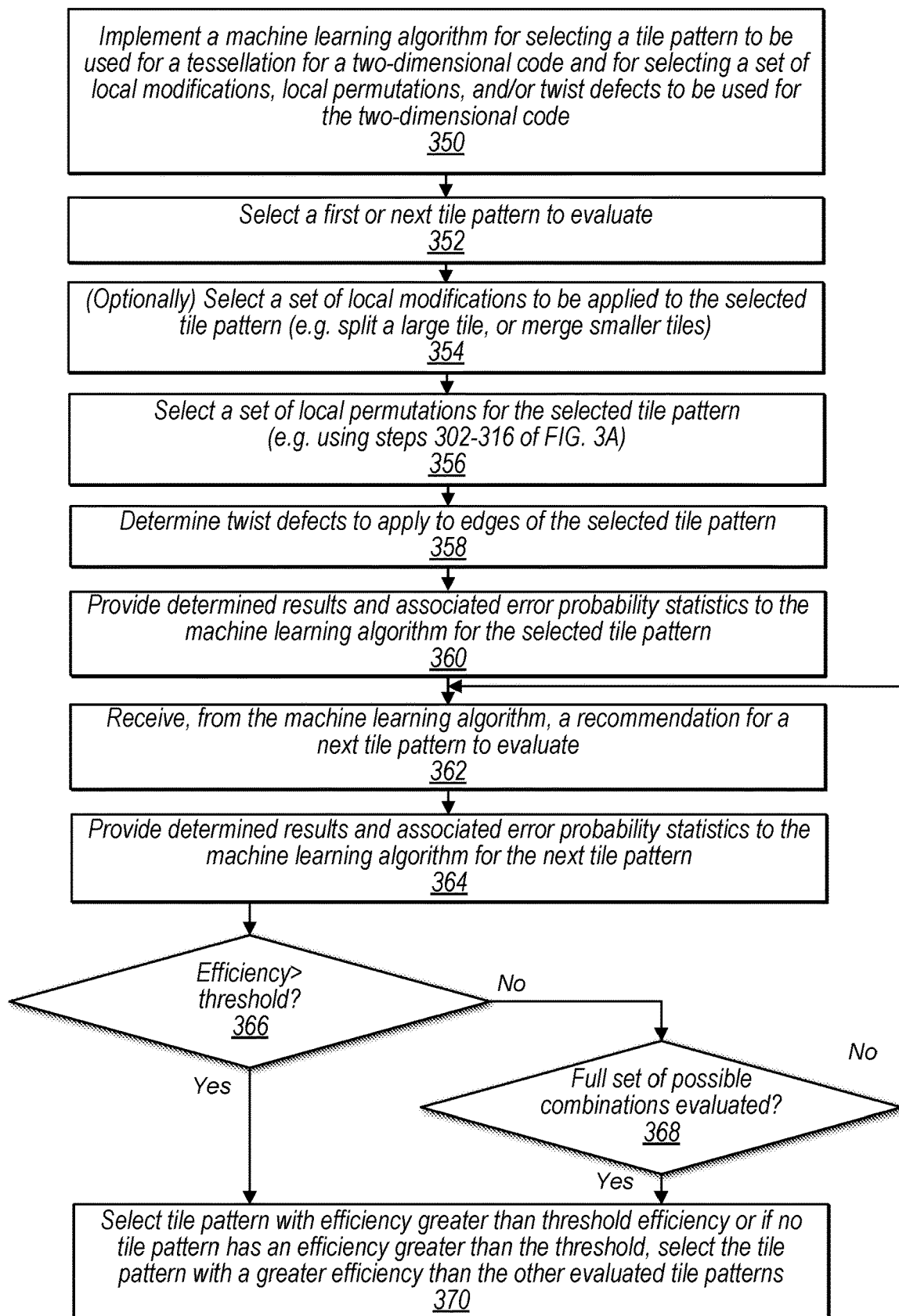
FIG. 3B is a flowchart illustrating a more detailed process for selecting, using a machine learning algorithm, a configuration to be used to implement a two-dimensional code for storing quantum information, according to some embodiments.

FIG. 3B is a flowchart illustrating a more detailed process for selecting, using a machine learning algorithm, a configuration to be used to implement a two-dimensional code for storing quantum information, according to some embodiments.

In some embodiments, a machine learning algorithm/machine learning service may be used to crawl through the landscape of possible local permutations as described in FIG. 3A. Also, in some embodiments a machine learning algorithm/machine learning service may be used to crawl through a landscape of possible tessellations, local modifications, twist defects, etc. that may be used in configuring a two-dimensional code.

For example, at block 350, a Pauli surface code selection service, such as Pauli surface code selection service 104, implements a machine learning algorithm, for example using machine learning service 110. The machine learning algorithm is implemented for selecting a tile pattern to be used for a tessellation for a two-dimensional code and for selecting a set of local modifications, local permutations, and/or twist defects to be used for the two-dimensional code.

At block 352, the Pauli surface code selection service selects a first (or next) tile pattern to evaluate. Also, at block 354, the Pauli surface code selection service optionally selects a set of local modifications to be applied to the selected tile pattern, such as splitting a large tile or merging smaller tiles. At block 346, the Pauli surface code selection service selects local permutations for qubits of the selected tile pattern. This may be iteratively performed using the machine learning service as described in FIG. 3A. At block 358, the Pauli surface code selection service determines a set of twist defects to apply to edges of the selected tile pattern. At block, 358, the Pauli surface code selection service evaluates the selected tile pattern with applied local modifications, local permutations, and twist defects and provides determined results and associated error probability statistics to the machine learning algorithm for the selected tile pattern with applied local modifications, local permutations, and twist defects. At block 362, the Pauli surface code selection service receives from the machine learning algorithm/machine learning service a recommendation for a next configuration to evaluate. Then at block 364, the Pauli surface code selection service evaluates the next configuration and provides determined results and associated error probability statistics to the machine learning algorithm.

At block 366, the Pauli surface code selection service determines whether one of the already evaluated configurations satisfies an efficiency threshold. If not, at block 368, the Pauli surface code selection service determines whether a full set of possible configuration combinations has already been evaluated. If not, the process reverts to 362 and a next configuration is evaluated.

At block 370, the Pauli surface code selection service selects a tile pattern and associated configuration with an efficiency greater than the threshold. Or, if no configuration was below the threshold, the Pauli surface code selection service selects a tile pattern and associated configuration with a greater efficiency than other ones of the tile patterns and associated configurations evaluated.

Figure 3C:
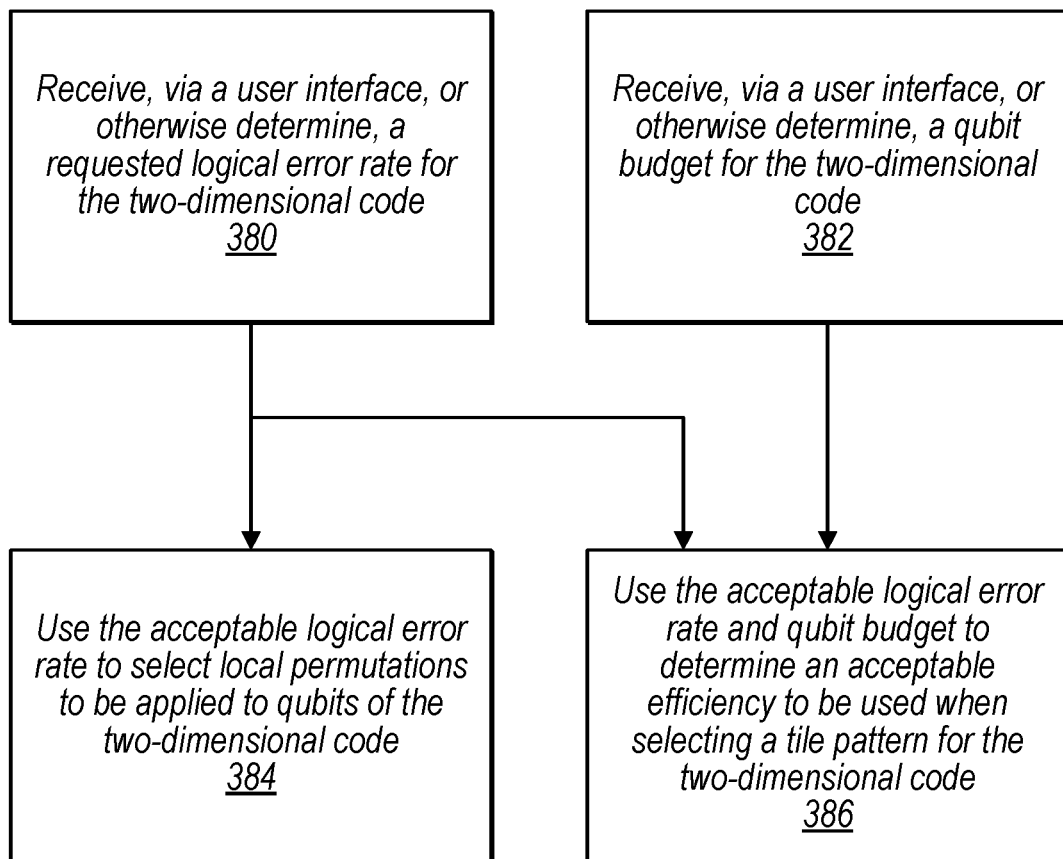
FIG. 3C is a flowchart illustrating an example process for determining parameters to be used by a machine learning algorithm (or other process) for selecting a configuration to be used to implement a two-dimensional code for storing quantum information, according to some embodiments.

FIG. 3C is a flowchart illustrating an example process for determining parameters to be used by a machine learning algorithm (or other process) for selecting a configuration to be used to implement a two-dimensional code for storing quantum information, according to some embodiments.

At block 380, a Pauli surface code selection service receives or otherwise determines a requested logical error rate for the two-dimensional code. Also, at block 382, the Pauli surface code selection service receives or otherwise determines a qubit budget for the two-dimensional code.

At block 384, the Pauli surface code selection service uses the received or determined acceptable logical error rate to select local permutations to be applied to qubits of the two-dimensional code. Also, at block 386, the Pauli surface code selection service uses the acceptable logical error rate and qubit budget to determine an acceptable efficiency to be used when selecting a tile pattern for the two-dimensional code.

Tensor Network Decoder with Accounting for Correlated Error

Traditionally, syndrome measurement decoders are designed assuming noise is "iid" noise (independent and identically distributed noise). In such designs it is assumed that each qubit is affected by X, Y, or Z error independently. However, in reality some errors are correlated between qubits, and such designs do not account for these types of errors.

For example, let G=(V,E) be a hypergraph with the sets of vertices V and hyperedges E. Recall that a hyperedge e∈E is a non-empty set of vertices, e.g., $\emptyset \neq e \subseteq V$. In the following discussion, consider hypergraphs without nested or repeated hyperedges.

An undirected graphical model with respect to the hypergraph G is the set of probability distributions on the random variables $\{P_v : v \in V\}$ which factor according to the hyperedges in E in the following way $$pr(\{P_v\}_{v \in V}) = \frac{1}{Z} \prod_{e \in E} \psi_e(\{P_v\}_{v \in e})$$

where Z is the normalization factor and $\psi_e$ is a clique potential for the hyperedge e∈E. In the following discussion, focus will be placed on the scenarios where the random variable $P_v$ describes a Pauli error on the qubit placed at the vertex v∈V. In other words, $P_v$ takes four values $p_i \in \{I, X, Y, Z\}$.

Let G'=(V, E') be a graph, which is constructed by taking all the vertices of the hypergraph G and adding an edge between two vertices u and v if and only if (iff) there exists a hyperedge e∈E comprising both u and v. Then, the undirected graphical model with respect to G is equivalent to a Markov random field, which can be factorized according to the cliques of G'.

For any hypergraph G construct a tensor network (TN) by first assigning to each hyperedge e∈E a positive integer $n_e$, and then assigning to each vertex v∈V a tensor $\mathbb{K} T_v \in \otimes_{e \in v} \mathbb{K}^{n_e}$. The hyperedges containing only one vertex are referred to as dangling edges. Note that the definition used covers the standard definition of a tensor network (TN) if the hyperedges in E are allowed to contain either one or two vertices. In such a case, the dangling edges correspond to the unmatched legs of the standard TN.

Figure 13B:
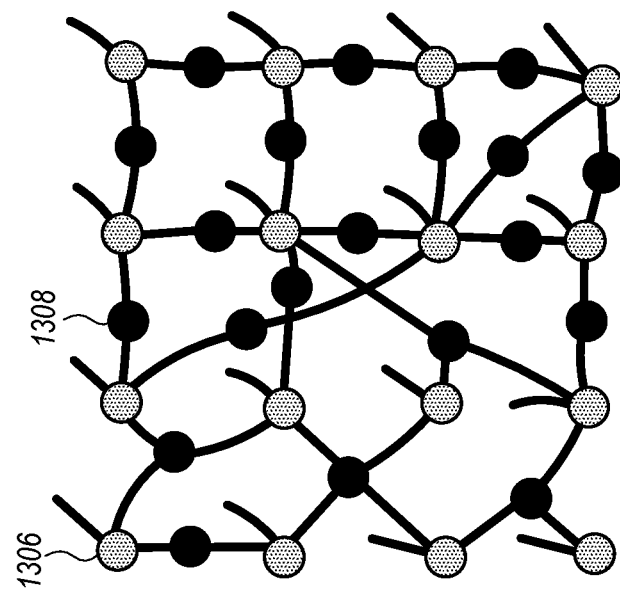
FIGS. 13A-13B illustrate a hypergraph being converted into a tensor noise network, according to some embodiments.
Figure 13A:
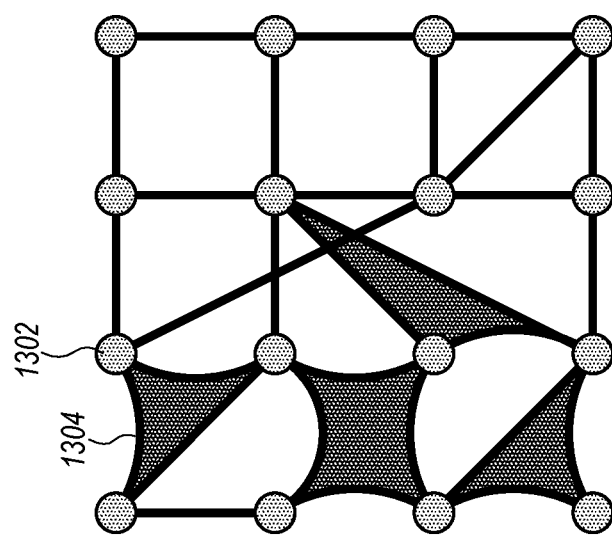

Any tensor network (TN) defined on the hypergraph G can be transformed into a standard TN as shown in FIGS. 13A and 13B by repeating the following procedure. First, find any hyperedge e∈E, which contains more than two vertices. Then, obtain a new hypergraph by: (i) adding a new vertex $v_e$, (ii) removing the hyperedge e, (iii) adding a new edge (u,v) for any two different vertices u, v∈V, which were incident to e. Lastly, the Kronecker delta tensor is assigned to the vertex $v_e$. For example, FIG. 13A shows a hypergraph G and FIG. 13B shows a standard tensor network generated using the hypergraph G shown in FIG. 13A.

Figure 10A:
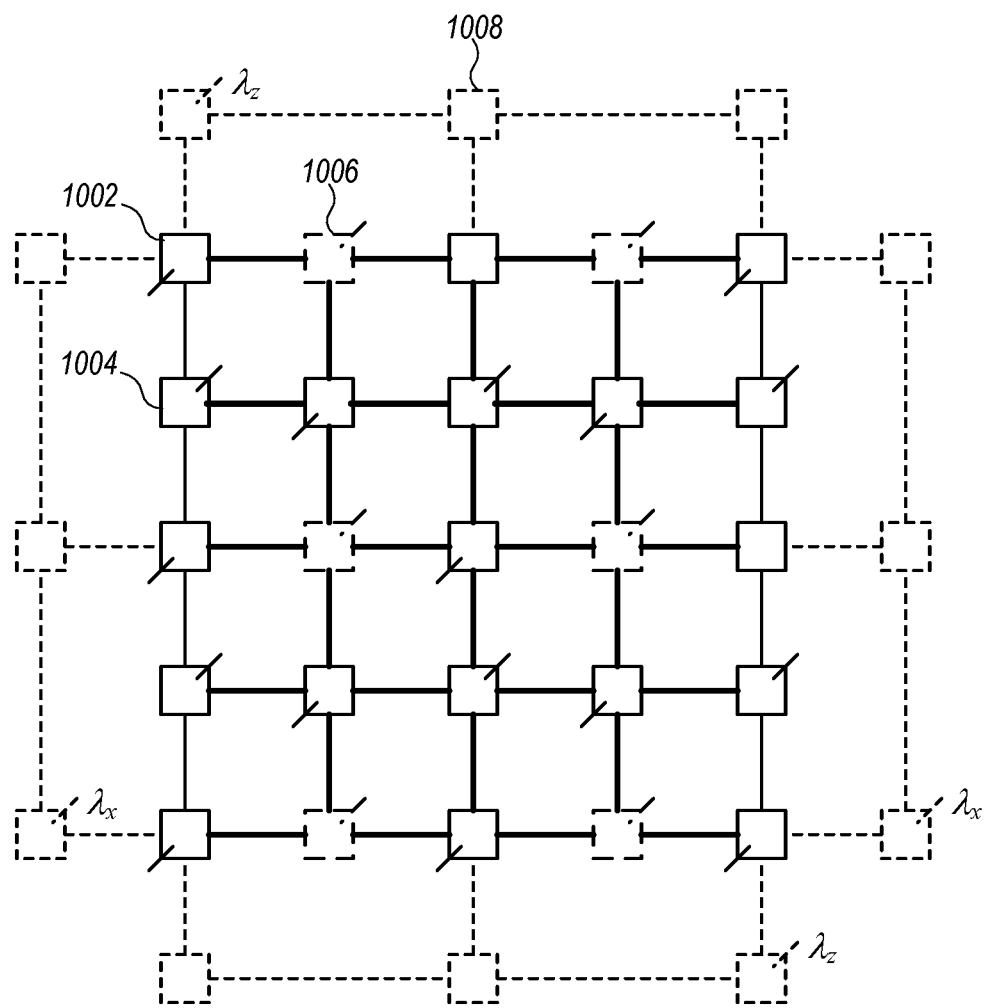
FIG. 10A illustrates a stabilizer-qubit tensor network, according to some embodiments.
Figure 10B:
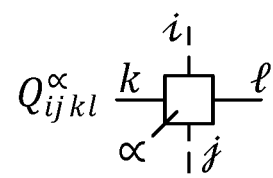
FIG. 10B illustrates a more detailed view of connecting legs for qubit tensors, stabilizer tensors (X-type stabilizer and Z-type stabilizers), and boundary tensors, according to some embodiments.
Figure 10B:
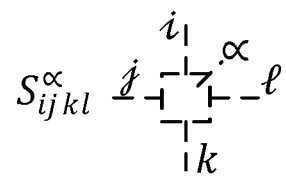
Figure 10B:
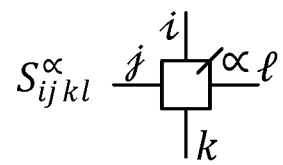
Figure 10B:
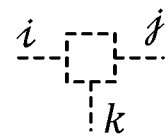

For simplicity, consider the toric code on the square lattice with boundary, which has one logical qubit as shown in FIG. 10A. The discussion is, however, general and can be straightforwardly applied to any Pauli surface code.

The idea behind tensor-network decoding is an observation that one can estimate the probability of each equivalence class of errors consistent with the observed syndrome by contracting certain tensor networks (TNs). For example, the stabilizer-qubit tensor network shown in FIG. 10A can be contracted with the noise tensor network shown in FIG. 13B to obtain a tensor network decoder. The stabilizer-qubit tensor network shown in FIG. 10A comprises qubit tensors 1002, stabilizer tensors 1004 and 1006 and boundary tensors 1008. FIG. 13B shows a corresponding noise tensor network. Note that the syndrome and the logical operator are fed into the unmatched legs of the stabilizer and boundary tensors as shown in FIG. 10C, whereas the noise tensor network is contracted with the unmatched legs of the qubit tensors. The boundary tensors can be split into a number of small boundary tensors.

Qubit-Stabilizer Tensor Network

In order to generate the tensor network decoder, the stabilizer-qubit tensor network is first introduced. The stabilizer-qubit tensor network (e.g. as shown in FIG. 10A) comprises two types of tensors, qubit and stabilizer tensors. Qubit tensors $Q_{ij:kl}^a$ have five legs (unless they correspond to qubits on the boundary, in which case some legs might be missing): i and j of X-type, k and I of Z-type, and a of probability-type. The type of the leg is determined by whether it connects the qubit tensor with the X- or Z-type stabilizer tensors or whether it is an input leg for the probability distribution of the error model. Thus, $$Q_{ij:kl}^a = \delta_{a,ik}\delta_{i,j}\delta_{k,l}$$

Stabilizer tensors S may have a different number of legs but in the considered case they have five (unless a stabilizer tensor on the boundary of the TN is considered, in which case some legs might be missing). The leg a is an input leg for the observed syndrome, the other legs i, j, . . . connect the stabilizer tensor with all the tensors corresponding to qubits in the support of that stabilizer. Thus, $$S_{ijkl}^\alpha = \left\{ \begin{array}{c} 1 \text{ if } \alpha + i + j + k + l \bmod 2 = 0 \\ 0 \text{ otherwise} \end{array} \right\}$$

In addition, there are four boundary tensors $$L_{i\ldots}^\lambda = \left\{ \begin{array}{c} 1 \text{ if } \lambda + \sum_i i \bmod 2 = 0 \\ 0 \text{ otherwise} \end{array} \right\}$$

In some embodiments, the boundary tensors L may be split up into smaller boundary tensors, such as $$L_{ijk} = \left\{ \begin{array}{c} 1 \text{ if } i + j + k \bmod 2 = 0 \\ 0 \text{ otherwise} \end{array} \right\}$$

It is emphasized that the stabilizer-qubit TN has vertical legs to feed the syndrome σ, the logical operator ($\lambda_X$, $\lambda_Z$), and the probability distribution of the error model. Also, unlike previous tensor networks, the stabilizer-qubit tensor network does not depend on a correction operator for a given syndrome σ.

Noise Tensor Network

A noise tensor network is defined to describe the noise model for the quantum hardware to be used to implement the two-dimensional code, such as a Pauli surface code selected using the procedure described above. For each qubit and an independent noise model, Pauli X, Y, and Z error rates are specified as $p_X$, $p_Y$, $p_Z$. This information is combined into a tensor $P^a$, where $a \in \{0,1\}^2$ and $P^{1,0} = p_X$, $P^{1,1} = p_Y$, $P^{0,1} = p_Z$, and $P^{0,0}=1-P_X-p_Y-p_Z$. The corresponding noise tensor network is then a collection of tensors $P^{a's}$, one for every qubit.

FIG. 9 illustrates an example quantum computing service that includes a Pauli surface code decoder, according to some embodiments.

In some embodiments, a quantum computing service, such as quantum computing service 102 illustrated in FIGS. 1, 9, and 15, may include a Pauli surface code decoder, such as Pauli surface code decoder 902. The Pauli surface code decoder 902 may receive a noise model, such as in the form of a hypergraph, from a quantum hardware provider. For example, noise model 918 may be received via network 920. Also, in some embodiments, quantum computing service 102 may generate a noise model 916 for use by Pauli surface code decoder 902. Additionally, Pauli surface code decoder 902 receives syndrome measurements 922, which may be provided to the Pauli surface code decoder from other components of the quantum computing service 102 which receive and/or store the syndrome measurements from a QPU of a quantum hardware provider. Additionally, the Pauli surface code decoder 902 may provide logical results to customers, such as logical results 924 provided to customers 926 via network 920. In some embodiments, different networks may be used to interface with customers and to interface with quantum hardware providers.

In some embodiments, Pauli surface code decoder 902 includes a noise model generator 904, which may be used to generate a noise model, if a noise model is not provided from a quantum hardware provider or other module of the quantum computing service 102. Additionally, or alternatively, Pauli surface code decoder 902 includes noise model interface 902 for receiving a noise model.

Pauli surface code decoder 902 also includes a noise model converter that converts a noise model, such as a hypergraph, into a tensor representation, such as a noise tensor network. For example, as shown in FIG. 13A, a graphical noise model can be provided for a hypergraph G=(V,E), whose vertices V (1302) correspond to single-qubit Pauli operators and hyperedges (1304) correspond to clique potentials. This noise model can be equivalently expressed as a tensor network associated with the hypergraph G*=(V*, E*) as shown in FIG. 13B. The tensors 1308 associated with the vertices V* are the corresponding clique potentials. The hyperedges E* correspond to the single-qubit Pauli operators. Each hyperedge can be replaced with a Kronecker delta tensor with one extra unmatched leg (1306). The resulting standard tensor network is the noise tensor network, which can then be contracted with the stabilizer-qubit tensor network to obtain the tensor network decoder.

For example, Pauli surface code decoder 902 includes tensor decoding model generator 910 which may generate a stabilizer-qubit tensor as shown in FIG. 10A. Also, Pauli surface code decoder 902 includes tensor decoding model and tensor noise model contracting 912 which may contract a noise model, such as shown in FIG. 13B, with the stabilizer-qubit tensor model shown in FIG. 10A. In some embodiments, the noise tensor network shown in FIG. 13B may be generated by converting a hypergraph as shown in FIG. 13A.

Pauli surface code decoder 902 also includes decoding module 914 which may comprise the stabilizer-qubit tensor network contracted with the noise tensor network, and which receives syndrome measurements 922 and provides logical results 924.

Figure 11A:
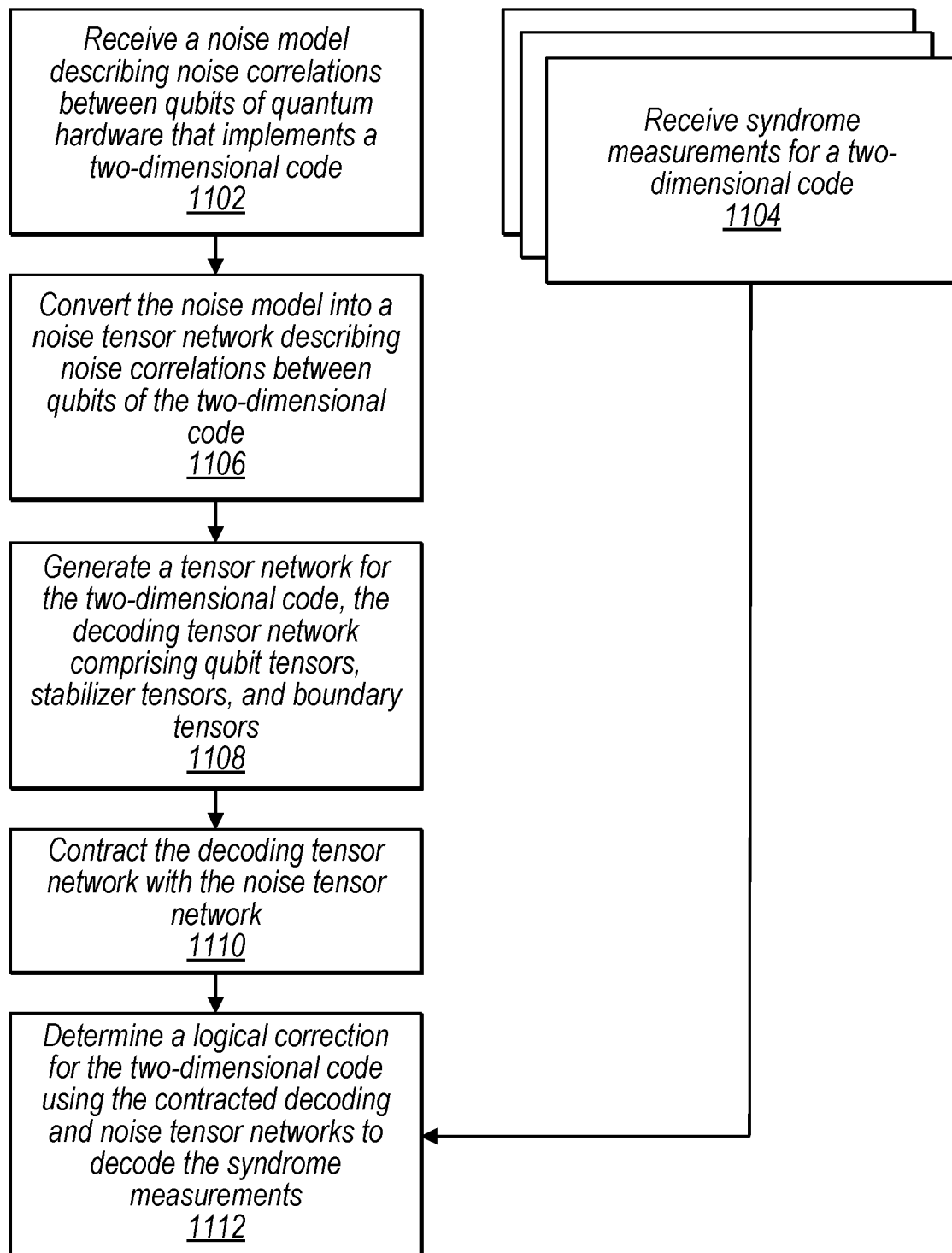
FIG. 11A is a flowchart illustrating an example process for decoding syndrome measurements of a Pauli surface code using a tensor network decoder, according to some embodiments.

FIG. 11A is a flowchart illustrating an example process for decoding syndrome measurements of a Pauli surface code using a tensor network decoder, according to some embodiments.

At block 1102, a Pauli surface code decoder receives a noise model describing noise correlations between qubits of quantum hardware that implements a two-dimensional code. At block 1106, the Pauli surface code decoder converts the noise model into a noise tensor network describing noise correlations between qubits of the two-dimensional code. At bock 1108, the Pauli surface code decoder generates a tensor network for the two-dimensional code, the tensor network comprising qubit tensors, stabilizer tensors, and boundary tensors. At block 1110, the Pauli surface code decoder contracts the tensor network with the noise tensor network. At block 1104, the Pauli surface code decoder receives syndrome measurements for a two-dimensional code. And, at block 1112, the Pauli surface code decoder determines a logical correction for the two-dimensional code using the contracted qubit-stabilizer tensor network and the noise tensor network to decode the syndrome measurements. Note that in some embodiments, the decoding tensor network generated at blocks 1102, 1106, 1108, and 1110 can be re-used to process multiple rounds of syndrome measurements received at blocks 1104.

FIG. 11B is a flowchart illustrating additional details regarding how a logical correction is determined when decoding syndrome measurements of a Pauli surface code using a tensor network decoder, according to some embodiments.

In some embodiments, in order to determine the logical correction, at block 1150, the Pauli surface code decoder evaluates a logical error rate for each choice of logical parameters (Xx) or (Xz) describing the logical operator based on error probabilities determined in part using the noise tensor network. At block 1152, the Pauli surface code decoder selects the choice of logical parameters (Xx) or (Xz) based on the evaluated logical error rate determined using the noise tensor network.

Figure 12:
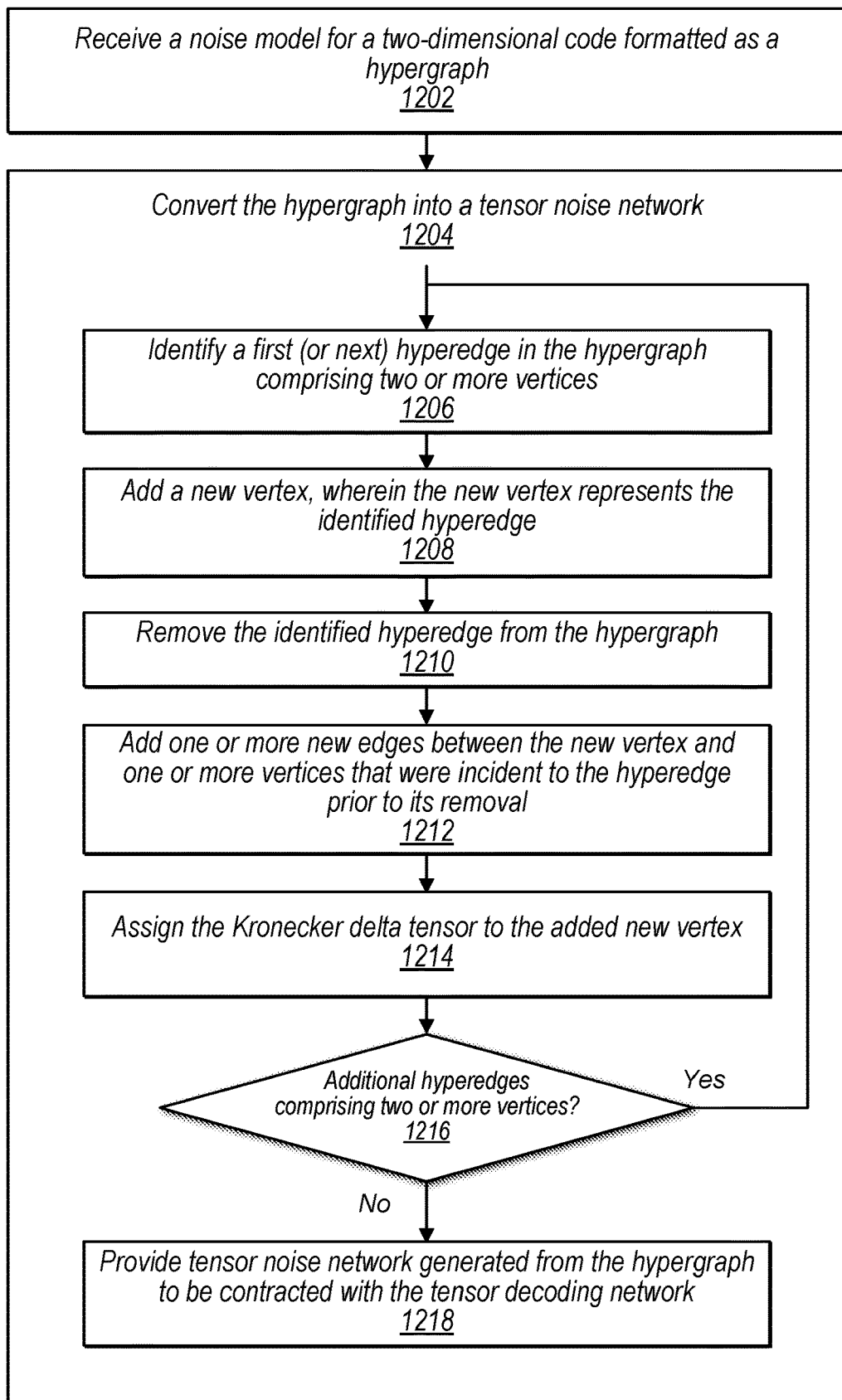
FIG. 12 is a flowchart illustrating a process for converting a hypergraph representing noise correlations between qubits and/or stabilizers of a quantum hardware device into a noise tensor network, according to some embodiments.

FIG. 12 is a flowchart illustrating a process for converting a hypergraph representing noise correlations between qubits and/or stabilizers of a quantum hardware device into a noise tensor network, according to some embodiments.

At block 1202 a Pauli surface code decoder receives a noise model for a two-dimensional code formatted as a hypergraph and at block 1204 converts the hypergraph into a noise tensor network. In order to convert the hypergraph, at block 1206, the Pauli surface code decoder, identifies a first (or next) hyperedge in the hypergraph comprising two or more vertices. Then, at block 1208, the Pauli surface code decoder adds a new vertex, wherein the new vertex represents the identified hyperedge. Next, at block 1210, the Pauli surface code decoder removes the identified hyperedge from the hypergraph and at block 1212 adds one or more new edges between the new vertex and one or more vertices that were incident to the hyperedge prior to its removal. Then at block 1214, the Pauli surface code decoder assigns a Kronecker delta tensor to the added new vertex. At block 1216, the Pauli surface code decoder determines whether there are additional hyperedges comprising two or more vertices that have not yet been converted. If so, the process reverts to block 1206. If not, at block 1218, the Pauli surface code provides the noise tensor network, which may further be contracted with the stabilizer-qubit tensor network (e.g., decoding tenor network) as described above.

Figure 14:
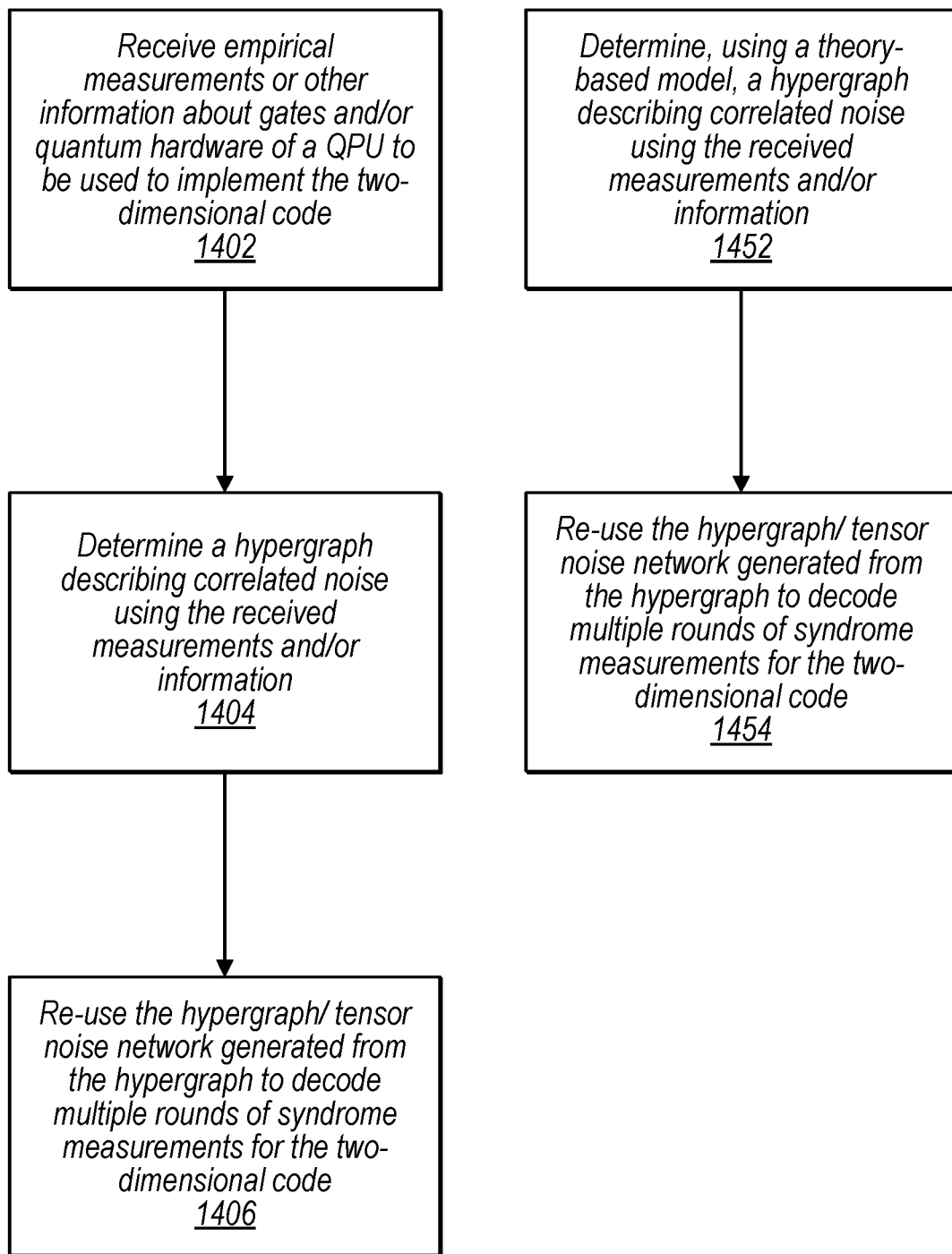
FIG. 14 is a flowchart illustrating example processes for generating a hypergraph describing noise correlations between qubits and/or stabilizers of a quantum hardware device, according to some embodiments.

FIG. 14 is a flowchart illustrating example processes for generating a hypergraph describing noise correlations between qubits and/or stabilizers of a quantum hardware device, according to some embodiments.

In some embodiments, a noise tensor network may be generated empirically or theoretically and may be re-used for multiple rounds of decoding.

For example, in some embodiments, at block 1402, noise model generator 904 receives empirical measurements or other information about gates and/or quantum hardware of a QPU to be used to implement the two-dimensional code. At block 1404, the noise model generator determines a hypergraph describing correlated noise using the received measurements and/or information. Also, at block 1406, the determined hypergraph/noise tensor network may be re-used to decode multiple rounds of syndrome measurements for the two-dimensional code. In a similar manner, at block 1452, the noise model generator may determine using a theory-based model, a hypergraph describing correlated noise using the received measurements and/or information. Also, at block 1454, the determined hypergraph/noise tensor network may be re-used to decode multiple rounds of syndrome measurements for the two-dimensional code. the Example Quantum Computing Service Quantum computers may be difficult and costly to construct and operate. Also, there are varying quantum computing technologies under development with no clear trend as to which of the developing quantum computing technologies may gain prominence. Thus, potential users of quantum computers may be hesitant to invest in building or acquiring a particular type of quantum computer, as other quantum computing technologies may eclipse a selected quantum computing technology that a potential quantum computer user may invest in. Also, successfully using quantum computers to solve practical problems may require significant trial and error and/or otherwise require significant expertise in using quantum computers.

As an alternative to building and maintaining a quantum computer, potential users of quantum computers may instead prefer to rely on a quantum computing service to provide access to quantum computers. Also, in some embodiments, a quantum computing service, such as quantum computing service 102 described herein, may enable potential users of quantum computers to access quantum computers based on multiple different quantum computing technologies and/or paradigms, without the cost and resources required to build or manage such quantum computers. Also, in some embodiments, a quantum computing service, as described herein, may provide various services that simplify the experience of using a quantum computer such that potential quantum computer users lacking deep experience or knowledge of quantum mechanics, may, never the less, utilize quantum computing services to solve problems.

Also, in some embodiments, a quantum computing service, as described herein, may be used to supplement other services offered by a service provider network. For example, a quantum computing service may interact with a classical computing service to execute hybrid algorithms. In some embodiments, a quantum computing service may allow a classical computer to be accelerated by sending particular tasks to a quantum computer for execution, and then further performing additional classical compute operations using the results of the execution of a quantum computing object on the quantum computer. For example, a quantum computing service may allow for the acceleration of virtual machines implemented on classical hardware in a similar manner as a graphics processing unit (GPU) may accelerate graphical operations that otherwise would be performed on a central processing unit (CPU).

In some embodiments, a quantum computing service may provide potential quantum computer users with access to quantum computers using various quantum computing technologies, such as quantum annealers, ion trap machines, superconducting machines, photonic devices, etc. In some embodiments, a quantum computing service may provide customers with access to at least three broad categories of quantum computers including quantum annealers, circuit-based quantum computers, and analog or continuous variable quantum computers. As used herein, these three broad categories may be referred to as quantum computing paradigms.

In some embodiments, a quantum computing service may be configured to provide simulation services using classical hardware-based computing instances to simulate execution of a quantum circuit on a quantum computer. In some embodiments, a quantum computing service may be configured to perform general simulation and/or simulation that specifically simulates execution of a quantum circuit on a particular type of quantum computer of a particular quantum computer technology type or paradigm type. In some embodiments, simulation may be fully managed by a quantum computing service on behalf of a customer of the quantum computing service. For example, the quantum computing service may reserve sufficient computing capacity on a virtualized computing service of the service provider network to perform simulation without customer involvement in the details of managing the resources for the simulator. Also, in some embodiments, a quantum computing service may maintain one or more "warm" simulators. The "warm" simulators may include simulators that are pre-configured on compute instances of a virtualized computing service and are already instantiated such that the simulators are ready to perform simulation on behalf of quantum computing service customers on demand.

In some embodiments, a quantum computing service as described herein may provide a customer with assistance in selecting a two-dimensional code to be used to store quantum information. For example, the customer may submit one or more parameters to guide selection of a two-dimensional code, such as a qubit budget and/or an error threshold, indicating an acceptable level of logical error in the results that may be permitted. The quantum computing service may then select a Pauli surface code configuration that meets the requirements of the customer.

In some embodiments, a quantum computing service as described herein may further provide decoding services, wherein syndrome measurements are decoded to determine a logical result for quantum information stored in a two-dimensional code. In some embodiments, a quantum computing service may decode syndrome measurements using a qubit and stabilizer tensor network contracted with a noise tensor network, such as is described above.

In some embodiments, a quantum computing service may include a dedicated console that provides customers access to multiple quantum computing technologies. Furthermore, the quantum computing service may provide a quantum algorithm development kit that enables customers with varying levels of familiarity with quantum circuit design to design and execute quantum circuits. In some embodiments, a console of a quantum computing service may include various application programmatic interfaces (APIs), such as:

(Create/Delete/Update/Get/List)Simulator-Configuration—create, read, update, and delete (CRUD) operations for simulator configuration objects.
(Start/Cancel/Describe)Simulator—used to control each of the user-defined simulator instances.

(List/Describe) quantum processor units (QPUs)—retrieves quantum computer hardware information.

(Create/Cancel/List/Describe)Task—used to manage the lifecycle of individual quantum tasks/quantum objects.

In some embodiments, a quantum algorithm development kit may include a graphical user interface, APIs or other interface to allow customers of a quantum computing service to define quantum objects, such as quantum tasks, algorithms or circuits, using the quantum algorithm development kit. In the some embodiments, the quantum algorithm development kit may include an interface option that enables customers to share the quantum objects with other customers of the quantum computing service. For example, the quantum algorithm development kit may include a marketplace that allows customers to share or sell particular quantum objects with other customers.

In some embodiments, a quantum computing service may include a public application programmatic interface (API) that accepts quantum objects submitted by a customer of the quantum computing service. Additionally, the quantum computing service may include a back-end API transport that is non-public. The back-end API transport may enable quantum circuits to be transported from a centralized location that implements the quantum computing service, such as one or more data centers of a service provider network, to an edge computing device at a particular quantum hardware provider location where the quantum circuit is to be executed.

In some embodiments, results of the execution of a quantum circuit on a quantum computer at a quantum hardware provider location may be provided to the edge computing device at the quantum hardware provider location. The edge computing device may automatically transport the results to a secure storage service of the service provider network, where the customer can access the results using the storage service of the service provider network or via a console of the quantum computing service.

In some embodiments, the results stored to the secure storage service may be seamlessly used by other services integrated into the service provider network, such as a machine learning service, a database service, an object-based storage service, a block-storage service, a data presentation service (that reformats the results into a more usable configuration), etc. For example, in some embodiments, a machine learning service may be used to optimize a quantum algorithm or quantum circuit. For example, the machine learning service may cause various versions of a quantum algorithm or quantum circuit to be run on a quantum computer via a quantum computing service. The machine learning service may also be provided access to results of running the quantum algorithms or quantum circuits. In some embodiments, the machine learning service may cause the quantum algorithms or quantum circuits to be run on various different quantum computing technology-based quantum computers. Based on the results, the machine learning service may determine one or more optimizations to improve the quantum algorithms or quantum circuits. Also, as described above, in some embodiments, the machine learning service may be used to facilitate selection of a Pauli surface code configuration, by guiding selection of Pauli surface code configurations to be evaluated.

In some embodiments, a quantum computing service may support creating snapshots of results of executing a quantum circuit. For example, the quantum computing service may store snapshots of intermediate results of a hybrid algorithm or may more generally store snapshots of any results generated by executing a quantum circuit on a quantum computer. In some embodiments, an edge computing device at a hardware provider location may temporarily store results and may create snapshot copies of results stored on the edge computing device. The edge computing device may further cause the snapshot copies to be stored in an object-based data storage service of the service provider network. In some embodiments, snapshotting may not be performed, based on customer preferences.

FIG. 15 illustrates a service provider network comprising a quantum computing service, virtual computing service, and storage service, according to some embodiments.

Service provider network 1500 may be set up by an entity such as a company or a public sector organization to provide one or more services (such as various types of cloud-based computing or storage) accessible via the Internet and/or other networks to customers 1550. Service provider network 1500 may include numerous data centers (such as the data centers and network spines) hosting various pools of resource hosts, such as collections of physical and/or virtualized computer servers, storage devices, networking equipment and the like (e.g., computing system 1600 described below with regard to FIG. 16), needed to implement and distribute the infrastructure and services offered by the service provider network 1500. In some embodiments, service provider network 1500 may provide computing resources, such as virtual compute service 1526, storage services, such as object-based storage service 1536 (which may include various storage types such as object/key-value based data stores or various types of database systems), and/or any other type of network-based services 1538. Customers 1550 may access these various services offered by provider network 1500 via network 1548. Likewise, network-based services may themselves communicate and/or make use of one another to provide different services. For example, computing resources offered to customers 1550 in units called "instances," such as virtual or physical compute instances or storage instances, may make use of other resources, such as data stored in object-based data storage service 1536 for the compute instances 1522*a*, 1522*b*, 1522*c* and 1522*c*.

Service provider network 1500 includes quantum computing service 102, which may be a quantum computing service 102 as illustrated in FIG. 1, wherein the quantum computing service includes a Pauli surface code selection module 104. Also, the quantum computing service 102 may be a quantum computing service 102 as illustrated in FIG. 9, wherein the quantum computing service 102 includes Pauli surface code decoder 902. In some embodiments, quantum computing service 102 as illustrated in FIG. 15 may include both a Pauli surface code selection module 104 and a Pauli surface code decoder 902.

In some embodiments, service provider network 1500 may include data centers, routers, networking devices, etc., such as of a cloud computing provider network. In some embodiments, customers 1550, may be connected to the service provider network 1500 in various ways, such as via a logically isolated connection over a public network, via a dedicated private physical connection, not accessible to the public, via a public Internet connection, etc.

In some embodiments, a quantum computing service 102 may include a quantum algorithm development kit 1514 and a translation module 1512.

Quantum computing service 102 is connected to quantum hardware providers 1540, 1542, 1544, and 1546. In some embodiments, quantum hardware providers 1540, 1542, 1544, and 1546 may offer access to run quantum objects on quantum computers that operate based on various different types of quantum computing technologies or paradigms, such as based on quantum annealing, ion-trap, superconductive materials, photons, etc.

In some embodiments, quantum computing service 102 includes a back-end API transport module 1510. In some embodiments, the back-end API transport module 1510 may be primarily implemented on edge computing devices of the quantum computing service that are located at the quantum hardware provider locations. Also, in some embodiments, at least some of the back-end API transport functionality may be implemented on the one or more computing devices of the service provider network that implement the quantum computing service.

Quantum circuits that have been translated by translation module 1512 may be provided to back-end API transport module 1510 in order for the translated quantum circuits to be transported to a quantum computer at a respective quantum hardware provider location. In some embodiments, back-end API transport 1510 may be a non-public API that is accessible by an edge computing device of service provider network 1500, but that is not publicly available. In some embodiments, edge computing devices at the quantum hardware providers 1540, 1542, 1544, and 1546 may periodically ping a quantum computer service side interface to the back-end API transport 1510 to determine if there are any quantum circuits waiting to be transported to the edge computing device. If so, the edge computing device may perform an API call to the back-end API transport 1510 to cause the quantum circuit to be transported over a private connection to the edge computing device and scheduled for execution on a quantum computer. In some embodiments, the edge computing device may queue the quantum circuit for execution on a quantum computer of the quantum hardware provider where the edge computing device is located. Also, the edge computing device may have been configured with a quantum machine image that enables the edge computing device to interface with a scheduling application of the quantum hardware provider, where the edge computing device is located, in order to schedule a time slot on the quantum computer of the quantum hardware provider to execute the quantum circuit via the back-end API transport 1510.

In some embodiments, results of executing the quantum circuit on the quantum computer at the quantum hardware provider location may be returned to the edge computing device at the quantum hardware provider location. The edge computing device and/or quantum computing service 102 may cause the results to be stored in a data storage system of the service provider network 1500. In some embodiments, results storage/results notification module 1516 may coordinate storing results and may notify a customer, such as customer 1550, that the results are ready from the execution of the customer's quantum object, such as a quantum task, quantum algorithm, or quantum circuit. In some embodiments, results storage/results notification module 1516 may cause storage space in a data storage service to be allocated to a customer to store the customer's results. Also, the results storage/results notification module 1516 may specify access restrictions for viewing the customer's results in accordance with customer preferences.

In some embodiments, quantum compute simulator using classical hardware 1518 of quantum computing service 102, may be used to simulate a quantum algorithm or quantum circuit using classical hardware. For example, one or more virtual machines of a virtual computing service, such as virtual computing service 1526, may be instantiated to process a quantum algorithm or quantum circuit simulation job. In some embodiments, quantum compute simulator using classical hardware 1518 may fully manage compute instances that perform quantum circuit simulation. For example, in some embodiments, a customer may submit a quantum circuit to be simulated and quantum compute simulator using classical hardware 1518 may determine resources needed to perform the simulation job, reserve the resources, configure the resources, etc. In some embodiments, quantum compute simulator using classical hardware 1518 may include one or more "warm" simulators that are pre-configured simulators such that they are ready to perform a simulation job without a delay typically involved in reserving resources and configuring the resources to perform simulation.

In some embodiments, quantum computing service 102 includes quantum hardware provider recommendation/selection module 1520. In some embodiments, quantum hardware recommendation/selection module 620 may make a recommendation to a quantum computing service customer as to which type of quantum computer or which quantum hardware provider to use to execute a quantum object submitted by the customer. Also, in some embodiments, quantum hardware recommendation/selection module 620 may coordinate with Pauli surface code selection module 104 to provide a recommendation to a customer regarding a configuration to be used for a two-dimensional code that stores quantum information Additionally, or alternatively, the quantum hardware provider recommendation/selection module 1520 may receive a customer selection of a quantum computer type and/or quantum hardware provider to use to execute the customer's quantum object, such as a quantum task, quantum algorithm, quantum circuit, etc. submitted by the customer or otherwise defined with customer input.

In some embodiments, a recommendation provided by quantum hardware provider recommendation/selection module 1520 may be based on one or more characteristics of a quantum object submitted by a customer and one or more characteristics of the quantum hardware providers supported by the quantum computing service 102, such as one or more of quantum hardware providers 1540, 1542, 1544, and 1546. In some embodiments, quantum computing service may model error probabilities of gates of a quantum circuit to make a recommendation.

In some embodiments, quantum hardware provider recommendation/selection module may make a recommendation based on known data about previously executed quantum objects similar to the quantum object submitted by the customer. For example, quantum computing service 102 may store certain amounts of metadata about executed quantum objects and use such metadata to make recommendations. In some embodiments, a recommendation may include an estimated cost to perform the quantum computing task by each of the first and second quantum hardware providers. In some embodiments, a recommendation may include an estimated error rate for each of the first and second quantum hardware providers in regard to performing the quantum computing task. In some embodiments, a recommendation may include an estimated length of time to execute the quantum computing task for each of the first and second quantum hardware providers. In some embodiments, a recommendation may include various other types of information relating to one or more quantum hardware providers or any combination of the above.

In some embodiments, quantum compute simulator using classical hardware 1518, may allow a customer to simulate one or more particular quantum computing technology environments. For example, a customer may simulate a quantum circuit in an annealing quantum computing environment and an ion trap quantum computing environment to determine simulated error rates. The customer may then use this information to make a selection of a quantum hardware provider to use to execute the customer's quantum circuit.

As noted above, virtual compute service 1526 may offer various compute instances to customers 1550. In some embodiments, some such compute instances may be instantiated on an edge computing device located at a quantum hardware provider location. For example, in some embodiments, one or more of resource hosts 1524a, 1524b, 1524c, or 1524n may be an edge computing device located at a quantum hardware provider location, such as a location of quantum hardware providers 1540, 1542, 1544, and/or 1546. Additionally, a virtual compute instance (e.g., virtual machine) may, for example, be implemented on one or more resource hosts 1524 that comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances of virtual compute service 1526 in different embodiments, including special purpose computer servers, storage devices, network devices and the like, such as edge computing devices located at a quantum hardware provider location. In some embodiments instance customers 1550 or any other user may be configured (and/or authorized) to direct network traffic to a compute instance. In various embodiments, compute instances may attach or map to one or more data volumes provided by a block-based storage service in order to obtain persistent block-based storage for performing various operations.

Compute instances may operate or implement a variety of different platforms, such as general purpose operating systems, application server instances, Java™ virtual machines (JVMs), special-purpose operating systems, platforms that support various interpreted or compiled programming languages such as Ruby, Perl, Python, C, C++ and the like, or high-performance computing platforms) suitable for performing client applications, without for example requiring the customer 1550 to access an instance.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc. and (in the case of reserved compute instances) reservation term length.

In some embodiments, an object-based storage service, such as object-based storage service 1536, may include a plurality of resource hosts that store snapshot objects and/or other storage objects. For example, object-based storage service 1536 includes resource hosts 1530a and 1530b through 1530n storing snapshot objects 1528a and 1528b through 1528n. Additionally, object-based storage service 1536 includes resource hosts 1534a and 1534b through 1534n storing storage objects 1532a and 1532b through 1532n. For ease of illustration, snapshot objects 1528 and storage objects 1532 are illustrated as being stored on different resource hosts of object-based storage service 1536. However, in some embodiments a same resource host of an object-based storage service, such as a resource host 1530 of object-based storage service 1536 may store both storage objects and snapshot objects, for example from a snapshot taken of intermediate results of execution of a hybrid algorithm, from final results from the execution of a of quantum computing object, or from a machine image used by a target volume of a block-based storage service to boot a compute instance, such as one of compute instances 1522. Also, a resource host 1530 of object-based storage service 1536 may store one or more quantum machine images used to boot a compute instance at an edge computing device that coordinates scheduling execution of quantum objects on quantum computer at a quantum hardware provider location where the edge computing device is located.

In addition, service provider network 1500 may implement other network-based services 1538, which may include various different types of analytical, computational, storage, or other network-based system allowing customers 1550, as well as other services of provider network 1500 (e.g., a block-based storage service, virtual compute service 1526 and/or object-based storage service 1536) to perform or request various tasks.

Customers 1550 may encompass any type of client configurable to submit requests to network provider 1500. For example, a given customer 1550 may include a suitable version of a web browser, or may include a plug-in module or other type of code module configured to execute as an extension to or within an execution environment provided by a web browser. Alternatively, a customer 1550 may encompass an application such as a database application (or user interface thereof), a media application, an office application or any other application that may make use of compute instances 1522, quantum compute service 1502, or other network-based service in provider network 1500 to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, customers 1550 may be configured to generate network-based services requests according to a Representational State Transfer (REST)-style network-based services architecture, a document- or message-based network-based services architecture, or another suitable network-based services architecture. In some embodiments, a customer 1550 (e.g., a computational client) may be configured to provide access to a compute instance 1522 or data storage object 1532 in a manner that is transparent to applications implemented on the customer 1550 utilizing computational resources provided by the compute instance 1522 or storage provided by the storage object 1532.

Customers 1550 may convey network-based services requests to service provider network 1500 via external network 1548. In various embodiments, external network 1548 may encompass any suitable combination of networking hardware and protocols necessary to establish network-based communications between customers 1550 and service provider network 1500. For example, a network 1548 may generally encompass the various telecommunications networks and service providers that collectively implement the Internet. A network 1548 may also include private networks such as local area networks (LANs) or wide area networks (WANs) as well as public or private wireless networks. For example, both a given customer 1550 and service provider network 1500 may be respectively provisioned within enterprises having their own internal networks. In such an embodiment, a network 1548 may include the hardware (e.g., modems, routers, switches, load balancers, proxy servers, etc.) and software (e.g., protocol stacks, accounting software, firewall/security software, etc.) necessary to establish a networking link between given customer 1550 and the Internet as well as between the Internet and service provider network 1500. It is noted that in some embodiments, customers 1550 may communicate with service provider network 1500 using a private network rather than the public Internet, such as a direct connection.

Illustrative Computer System

Figure 16:
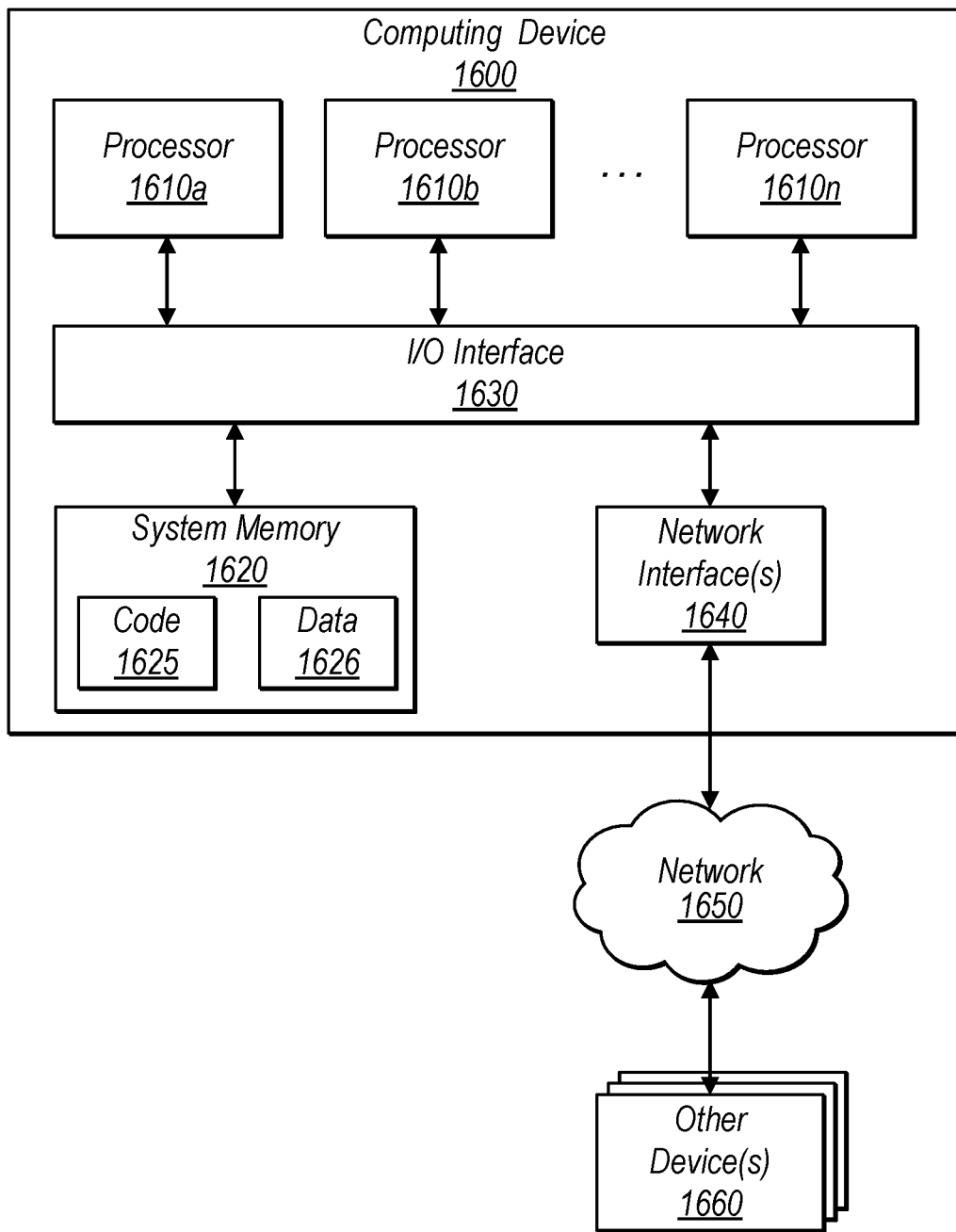
FIG. 16 is a block diagram illustrating an example classical computing device that may be used in at least some embodiments.

FIG. 16 is a block diagram illustrating an example computing device that may be used in at least some embodiments.

FIG. 16 illustrates such a general-purpose computing device 1600 as may be used in any of the embodiments described herein. In the illustrated embodiment, computing device 1600 includes one or more processors 1610 coupled to a system memory 1620 (which may comprise both non-volatile and volatile memory modules) via an input/output (I/O) interface 1630. Computing device 1600 further includes a network interface 1640 coupled to I/O interface 1630.

In various embodiments, computing device 1600 may be a uniprocessor system including one processor 1610, or a multiprocessor system including several processors 1610 (e.g., two, four, eight, or another suitable number). Processors 1610 may be any suitable processors capable of executing instructions. For example, in various embodiments, processors 1610 may be general-purpose or embedded processors implementing any of a variety of instruction set architectures (ISAs), such as the x86, PowerPC, SPARC, or MIPS ISAs, or any other suitable ISA. In multiprocessor systems, each of processors 1610 may commonly, but not necessarily, implement the same ISA. In some implementations, graphics processing units (GPUs) may be used instead of, or in addition to, conventional processors.

System memory 1620 may be configured to store instructions and data accessible by processor(s) 1610. In at least some embodiments, the system memory 1620 may comprise both volatile and non-volatile portions; in other embodiments, only volatile memory may be used. In various embodiments, the volatile portion of system memory 1620 may be implemented using any suitable memory technology, such as static random-access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 1620 as code 1625 and data 1626.

In some embodiments, I/O interface 1630 may be configured to coordinate I/O traffic between processor 1610, system memory 1620, and any peripheral devices in the device, including network interface 1640 or other peripheral interfaces such as various types of persistent and/or volatile storage devices. In some embodiments, I/O interface 1630 may perform any necessary protocol, timing or other data transformations to convert data signals from one component (e.g., system memory 1620) into a format suitable for use by another component (e.g., processor 1610). In some embodiments, I/O interface 1630 may include support for devices attached through various types of peripheral buses, such as a variant of the Peripheral Component Interconnect (PCI) bus standard or the Universal Serial Bus (USB) standard, for example. In some embodiments, the function of I/O interface 1630 may be split into two or more separate components, such as a north bridge and a south bridge, for example. Also, in some embodiments some or all of the functionality of I/O interface 1630, such as an interface to system memory 1620, may be incorporated directly into processor 1610.

Network interface 1640 may be configured to allow data to be exchanged between computing device 1600 and other devices 1660 attached to a network or networks 1650, such as other computer systems or devices as illustrated in FIG. 1 through FIG. 15, for example. In various embodiments, network interface 1640 may support communication via any suitable wired or wireless general data networks, such as types of Ethernet network, for example. Additionally, network interface 1640 may support communication via telecommunications/telephony networks such as analog voice networks or digital fiber communications networks, via storage area networks such as Fibre Channel SANs, or via any other suitable type of network and/or protocol.

In some embodiments, system memory 1620 may represent one embodiment of a computer-accessible medium configured to store at least a subset of program instructions and data used for implementing the methods and apparatus discussed in the context of FIG. 1 through FIG. 15. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 1600 via I/O interface 1630. A non-transitory computer-accessible storage medium may also include any volatile or non-volatile media such as RAM (e.g., SDRAM, DDR SDRAM, RDRAM, SRAM, etc.), ROM, etc., that may be included in some embodiments of computing device 1600 as system memory 1620 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 1640. Portions or all of multiple computing devices such as that illustrated in FIG. 16 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A method for implementing a two-dimensional code for storing quantum information, the method comprising:
   determining or receiving a noise model indicating noise error rates associated with gates of a quantum hardware device to be used to implement the two-dimensional code;
   selecting a tile pattern describing a layout of the two-dimensional code, wherein the tiles specify locations of qubits and support of stabilizer generators;
   determining local permutations assigned to the qubits, wherein said determining the local permutation comprises:
      selecting a set of local permutations;
      determining, using the noise model, a logical error rate for the two-dimensional code with the selected set of local permutations;
      repeating said selecting and said determining for a plurality of sets of local permutations; and
      selecting a given one of the plurality of sets of local permutations that results in a lower logical error rate than other ones of the sets of local permutations; and
   implementing the two-dimensional code on the quantum hardware device, wherein the two-dimensional code comprises qubits arranged according to the selected tile pattern and the selected set of local permutations.

2. The method of claim 1, wherein the selected tile pattern comprises:
   tiles that are two-colorable as X-colored tiles or Z-colored tiles;
   edges bounding the tiles such that no edge bounds more than two tiles;
   interior vertices incident to four edges;
   boundary vertices incident to three or four edges; and
   one qubit located at every vertex.

3. The method of claim 2, wherein:
   selecting a set of local permutations comprises:
      selecting, for respective qubits of the selected tile pattern, a local permutation;
      specifying, for respective tiles of the selected tile pattern, a stabilizer generator, wherein the stabilizer generator is determined based on the color of the tile and the local permutations assigned to qubits that belong to the tile.

4. The method of claim 3, further comprising:
   selecting one or more edge locations of twist defects for the selected tile pattern, wherein the edge locations make up non-intersecting paths of interior edges of tiles of the selected tile pattern;
   replacing, for respective edges of twist defects, two stabilizer generators for two tiles bounded by said edge with a product of the two stabilizer generators; and
   removing qubits for vertices of the selected tile pattern incident to only two edges of the selected tile pattern that are not edge locations of twist defects.

5. The method of claim 1, wherein said determining the local permutations assigned to the qubits of the tile pattern further comprises:
   selecting the first or next set of permutations to be applied using a machine learning algorithm, wherein the determined logical error rates are provided to the machine learning algorithm for use in performing said selecting.

6. The method of claim 1, wherein said selecting the tile pattern describing the layout of the two-dimensional code comprises:
   selecting, using a machine learning algorithm, a tile pattern describing the layout of the two-dimensional code, wherein the tiles specify the locations of qubits and the support of stabilizer generators.

7. The method of claim 6, wherein selecting the tile pattern further comprises:
   sampling, by the machine learning algorithm, a set of possible tile patterns for the two-dimensional code.

8. The method of claim 1, wherein a machine learning algorithm is used to perform:
   said selecting the tile pattern describing the layout of the two-dimensional code; and
   said determining local permutations assigned to the qubits.

9. The method of claim 8, further comprising:
   receiving a qubit budget for the two-dimensional surface code, wherein the machine learning algorithm is configured to select the tile pattern and the local permutations such that a total number of qubits of the two-dimensional code does not exceed the qubit budget.

10. One or more non-transitory, computer-readable media storing program instructions, that when executed on or across one or more processors, cause the one or more processors to:
   receive a noise model indicating noise error rates associated with gates of a quantum hardware device to be used to implement a two-dimensional code;
   determine local permutations assigned to qubits of a tile pattern, wherein to determine the local permutation the program instructions, when executed on or across the one or more processors, cause the one or more processors to:
      select a first or next set of local permutations;
      determine, using the noise model, a logical error rate for the two-dimensional code when the first or next set of local permutations is assigned;

repeat said selecting and said determining for a plurality of sets of local permutations; and
select a given one of the plurality of sets of local permutations that results in a lower logical error rate than other ones of the sets of local permutations; and
provide instructions for implementing the two-dimensional code on the quantum hardware device using the selected set of local permutations.

11. The one or more non-transitory, computer-readable media of claim 10, wherein the instructions for implementing the two-dimensional code on the quantum hardware device instruct the two-dimensional code to be implemented such that the selected tile pattern comprises:
tiles that are two-colorable as X-colored tiles or Z-colored tiles;
edges bounding the tiles such that no edge bounds more than two tiles;
interior vertices incident to four edges;
boundary vertices incident to three or four edges; and
one qubit located at every vertex.

12. The one or more non-transitory, computer-readable media of claim 10, wherein the program instructions, when executed on or across the one or more processors, further cause the one or more processors to:
implement a machine learning algorithm for selecting the given one of the plurality of sets of local permutations that results in the lower logical error rate than the other ones of the sets of local permutations, wherein the determined logical error rates are provided to the machine learning algorithm.

13. The one or more non-transitory, computer-readable media of claim 10, wherein the program instructions, when executed on or across the one or more processors, further cause the one or more processors to:
select, using the machine learning algorithm, a tile pattern describing the layout of the two-dimensional code, wherein the tiles specify the locations of qubits and the support of stabilizer generators.

14. The one or more non-transitory, computer-readable media of claim 13, wherein the program instructions, when executed on or across the one or more processors, further cause the one or more processors to:
receive a qubit budget for the two-dimensional surface code, wherein the machine learning algorithm is configured to select the tile pattern and the local permutations such that a total number of qubits of the two-dimensional code does not exceed the qubit budget.

15. The one or more non-transitory, computer-readable media of claim 13, wherein the machine algorithm is configured to select tile pattern based on sampling a set of possible tile patterns for the two-dimensional code.

16. The one or more non-transitory, computer-readable media of claim 10, wherein the program instructions, when executed on or across the one or more processors, further cause the one or more processors to:
determine the local permutations to be included in the plurality of sets of local permutations, wherein to determine the local permutations the program instructions, when executed on or across the one or more processors, cause the one or more processors to include in the instructions for implementing the two-dimensional code:
a qubit added at every vertex of the selected tile pattern; and
a stabilizer generator specified for every tile of the selected tile pattern, wherein the stabilizer generator is determined by the color of the tile and the local permutations assigned to qubits that belong to the tile.

17. The one or more non-transitory, computer-readable media of claim 10, wherein the program instructions, when executed on or across the one or more processors, further cause the one or more processors to include in the instructions for implementing the two-dimensional code on a quantum hardware device such that:
one or more edge locations of twist defects are selected for a selected tile pattern, wherein the edge locations make up non-intersecting paths of interior edges of tiles of the selected tile pattern;
for respective edges of twist defects, two stabilizer generators for two tiles bounded by said edge are replaced with a product of the two stabilizer generators; and
qubits for vertices of the selected tile pattern incident to only two edges of the selected tile pattern that are not edge locations of twist defects are removed.

18. A system, comprising:
quantum hardware configured to implement a two-dimensional code comprising:
qubits arranged according to a tile pattern, wherein the tile pattern describes the layout of the two-dimensional code with a set of physical qubits determined based on the tile pattern; and
stabilizers that are specified by a set of local permutations and the tile pattern,
wherein the tile pattern is specified in a bounded rectangular region defined by at least:
a first dimension ($d_X$) proportional to the number of tiles in the tile pattern arranged along the first dimension and
a second dimension ($d_Z$) proportional to the number of tiles in the tile pattern arranged along the second dimension,
wherein a total number of physical qubits included in the two-dimensional code per logical qubit is proportional to $d_X*d_Z$.

19. The system of claim 18, wherein at least:
one or more edge locations of twist defects are selected for the selected tile pattern, wherein the edge locations make up non-intersecting paths of interior edges of tiles of the selected tile pattern;
for every edge of twist defects, two stabilizer generators for two tiles bounded by said edge are replaced with a product of the two stabilizer generators; and
qubits for vertices of the selected tile pattern incident to only two edges of the selected tile pattern that are not edge locations of twist defects are removed.

20. The system of claim 18, further comprising:
one or more classical computing devices configured to implement a machine learning algorithm configured to:
select the tile pattern to be used for the two-dimensional code; and
select local permutations to assigned to qubits of the two-dimensional code.

* * * * *